(12) United States Patent
Kirti et al.

(10) Patent No.: US 10,063,654 B2
(45) Date of Patent: Aug. 28, 2018

(54) SYSTEMS AND METHODS FOR CONTEXTUAL AND CROSS APPLICATION THREAT DETECTION AND PREDICTION IN CLOUD APPLICATIONS

(71) Applicant: Oracle International Corporation, Redwood Shores, CA (US)

(72) Inventors: Ganesh Kirti, San Jose, CA (US); Kamalendu Biswas, San Ramon, CA (US); Prakash Gurumurthy, Santa Clara, CA (US); Raja S. Alomari, Milpitas, CA (US); Sumedha Nalin Perera, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/749,522

(22) Filed: Jun. 24, 2015

(65) Prior Publication Data
US 2015/0319185 A1    Nov. 5, 2015

Related U.S. Application Data

(63) Continuation-in-part of application No. 14/523,804, filed on Oct. 24, 2014, now Pat. No. 9,692,789.
(Continued)

(51) Int. Cl.
*H04L 29/08*      (2006.01)
*H04L 29/06*      (2006.01)

(52) U.S. Cl.
CPC ........ *H04L 67/306* (2013.01); *H04L 63/1416* (2013.01); *H04L 63/107* (2013.01); *H04L 63/108* (2013.01); *H04L 63/1433* (2013.01)

(58) Field of Classification Search
CPC . H04L 67/306; H04L 63/1416; H04L 63/107; H04L 63/108; H04L 63/1433
See application file for complete search history.

(56) References Cited

U.S. PATENT DOCUMENTS

| 7,603,452 B1 | 10/2009 | Guo |
| 7,647,622 B1 | 1/2010 | Sobel et al. |

(Continued)

FOREIGN PATENT DOCUMENTS

| WO | 2014052892 A1 | 4/2014 |
| WO | 2014138120 A1 | 9/2014 |

(Continued)

OTHER PUBLICATIONS

International Search Report and Written Opinion for International Application PCT/US2014/065523, Report Completed Jan. 22, 2015, dated Feb. 23, 2015, 12 Pgs.

(Continued)

*Primary Examiner* — Catherine Thiaw
*Assistant Examiner* — Carlton Johnson
(74) *Attorney, Agent, or Firm* — Kilpatrick Townsend & Stockton LLP

(57) ABSTRACT

Systems and methods for contextual and cross application threat detection in cloud applications in accordance with embodiments of the invention are disclosed. In one embodiment, a method for detecting threat activity in a cloud application using past activity data from cloud applications includes receiving activity data concerning actions performed by a user account associated with a user within a monitored cloud application, receiving external contextual data about the user that does not concern actions performed using the user account within the monitored cloud application, where the external contextual data is retrieved from outside of the monitored cloud application, deriving a base- (Continued)

line user profile using the activity data and external contextual data and associating the baseline user profile with the user account, and determining the likelihood of anomalous activity using the baseline user profile.

28 Claims, 17 Drawing Sheets

Related U.S. Application Data

(60) Provisional application No. 61/916,070, filed on Dec. 13, 2013.

(56) References Cited

U.S. PATENT DOCUMENTS

| | | | |
|---|---|---|---|
| 2003/0048174 A1 | 3/2003 | Stevens et al. | |
| 2004/0083178 A1* | 4/2004 | Tanaka | G06F 21/10 705/50 |
| 2005/0188222 A1* | 8/2005 | Motsinger | G06F 21/316 726/5 |
| 2008/0271143 A1* | 10/2008 | Stephens | H04L 41/5061 726/22 |
| 2010/0151816 A1* | 6/2010 | Besehanic | G06Q 30/02 455/405 |
| 2010/0180001 A1* | 7/2010 | Hardt | G06F 11/32 709/207 |
| 2010/0268570 A1* | 10/2010 | Rodriguez | G06Q 10/025 705/7.13 |
| 2011/0167469 A1 | 7/2011 | Letca et al. | |
| 2011/0185055 A1 | 7/2011 | Nappier et al. | |
| 2011/0219434 A1 | 9/2011 | Betz | |
| 2012/0030767 A1 | 2/2012 | Rippert, Jr. et al. | |
| 2012/0240183 A1 | 9/2012 | Sinha | |
| 2012/0304249 A1 | 11/2012 | Luo et al. | |
| 2013/0036459 A1 | 2/2013 | Liberman et al. | |
| 2013/0066945 A1 | 3/2013 | Das et al. | |
| 2013/0111547 A1 | 5/2013 | Kraemer | |
| 2013/0191921 A1* | 7/2013 | Mahaffey | G06F 21/577 726/25 |
| 2013/0254831 A1* | 9/2013 | Roach | H04L 63/107 726/1 |
| 2013/0275574 A1 | 10/2013 | Hugard, IV et al. | |
| 2015/0033285 A1 | 1/2015 | Gao et al. | |
| 2015/0106935 A1 | 4/2015 | Burns et al. | |
| 2015/0172321 A1 | 6/2015 | Kirti et al. | |
| 2016/0012081 A1 | 1/2016 | Zimmermann et al. | |
| 2017/0251013 A1 | 8/2017 | Kirti et al. | |
| 2017/0295199 A1 | 10/2017 | Kirti et al. | |

FOREIGN PATENT DOCUMENTS

| | | |
|---|---|---|
| WO | 2015088702 A2 | 6/2015 |
| WO | 2017147525 | 8/2017 |

OTHER PUBLICATIONS

Gupta, Manjeet et al., "Identification of Effective Public Cloud on User Query", Retrieved on Jan. 22, 2015, Retrieved from the internet: http://ijcttjournal.org/Volume4/issue-7/IJCTT-V4I7P103.pdf, Jul. 7, 2013, 5 Pgs.

International Preliminary Report on Patentability for International Application PCT/US2014/065523, dated Jun. 14, 2016, dated Jun. 14, 2016, 11 Pgs.

Artificial neural network, Wikipedia, Available at: https://en.wikipedia.org/wiki/Artificial_neural_network, retrieved on May 29, 2017, 22 pages.

Decision Tree Learning, Wikipedia, Available at: https://en.wikipedia.org/wiki/Decision_tree_learning, retrieved on May 29, 2017, 9 pages.

Girvan et al., "Newman algorithm", Available at: https://en.wikipedia.org/wiki/Girvan%E2%80%93Newman_algorithm, retrieved on May 29, 2017, 2 pages.

Instantly Start Monitoring the Cybersecurity Health of Any Organization, Security Scorecard, Available at: https://securityscorecard.com/, retrieved on May 29, 2017, 15 pages.

Linear regression, Wikipedia, Available at: https://en.wikipedia.org/wiki/Linear_regression, retrieved on May 29, 2017, 1 page.

MCL—a cluster algorithm for graphs, https://micans.org/mcl/, retrieved on Jun. 1, 2017, 1 page.

Banker, Ransomware Tracker, The Swiss Security Blog, http://www.abuse.ch/, Jan. 28, 2015, 7 pages.

The new standard in business data, Clearbit, Available at: https://clearbit.com/, retrieved on May 29, 2017, 7 pages.

Wikipedia—The Free Encyclopedia, Available at: https://www.wikipedia.org/, retrieved on May 29, 2017, 2 pages.

U.S. Appl. No. 14/523,804, Non-Final Office Action dated Sep. 27, 2016, 37 pages.

U.S. Appl. No. 14/523,804, Notice of Allowance dated Apr. 5, 2017, 11 pages.

U.S. Appl. No. 15/441,154, filed Feb. 23, 2017, 131 pages.

International Application No. PCT/US2017/019508, International Search Report and Written Opinion dated May 2, 2017, 10 pages.

International Application No. PCT/US2017/19508, filed Feb. 24, 2017, 129 pages.

U.S. Appl. No. 15/632,174, Non-Final Office Action dated Feb. 22, 2018, 37 pages.

* cited by examiner

Incidents

Search Filter

| ID | Cloud App | Category | Assigned to | Created on | Priority | Status |
|----|-----------|----------|-------------|------------|----------|--------|
|    | All ▽ | All ▽ | All ▽ |  | All ▽ | Open ▽ |

[Search] Reset

Create New Incident ✕

| ID | App Application Instance | Category | Priority | Assigned To | Created On | Details | Remediation Type | Status | Action |
|----|--------------------------|----------|----------|-------------|------------|---------|------------------|--------|--------|
| 1020225 | Box RI | Security Control | High | iqhckju3fa | 2014-10-23 | Security level lower than recommended | Manual | Open | ✎ ✿ 🗑 |
| 1020200 | Box RI | Security Control | High | iqhckju3fa | 2014-10-23 | Security level lower than recommended | Manual | Open | ✎ ✿ 🗑 |
| 1020250 | Box RI | Anomalous Activity | Medium | | 2014-10-23 | User Behavior Risk Related to Login Activity. Observed for boxme2013@hotmail.com of Box Application and Instance RI on 2014-10-24 | Manual | Open | ✎ ✿ 🗑 |
| 1020275 | Box RI | Anomalous Activity | High | iqhckju3fa | 2014-10-20 | Account boxme2013@hotmail.com of Box application instance RI performed suspicious activities | Manual | Open | ✎ ✿ 🗑 |
| 1020300 | Box RI | Anomalous Activity | High | iqhckju3fa | 2014-10-20 | Account boxme2014@hotmail.com of Box application instance RI performed suspicious activities | Manual | Open | ✎ ✿ 🗑 |
| 2840001 | AWS aws_inst | Anomalous Activity | High | iqhckju3fa | 2014-10-20 | Account raloman of AWS application instance aws_inst performed suspicious activities | Manual | Open | ✎ ✿ 🗑 |
| 1020105 | SFDC RI | Anomalous Activity | High | Support | 2014-10-09 | Account ellen.schwab@keytech.com of SFDC application instance RI performed suspicious activities | Manual | Open | ✎ ✿ 🗑 |
| 12830108 | SFDC RI | Anomalous Activity | High | Admin | 2014-10-09 | User Behavior Risk Related to Mass Delete, Transfer, or Export: Observed for edward.murali@keytech.com of SFDC Application and Instance RI | Manual | Open | ✎ ✿ 🗑 |
|  |  |  |  |  |  | User Behavior Risk Related to Manage Users Changes: |  |  |  |

FIG. 8B

Manage app instances
- Register an app instance
- Modify app instances
- Remove app instances

Register an app instance

1. Select an app type ⌄
2. Select monitoring type ⌄
3. Select security controls ⌄
4. Enter credentials box
test

3. Select security controls

Standard ———●——— Stringent        Custom

▾ Password Controls

| Security Control | Value |
|---|---|
| Minimum required characters | 10 |
| Require numbers(s) | 2 |
| Require special character(s) | 1 |
| Require at least one uppercase letter | ◉◯ |
| Prevent common words / email address as a password | ◉◯ |
| Password resets: Require users to reset password every: | 30 days |
| Prevent reusing passwords from | Last 10 times |
| Notify admins when users request a forget password email | ◉◯ |
| Notify admins when users change passwords in Settings | ◉◯ |
| Require strong passwords for external collaborators | ◉◯ |

▸ Authentication Policies
▸ Session Policies
▸ Settings

Approval

☐ I understand and explicitly approve the seedings of controls in to "Box - test" with controls setting as "Stringent"

[< Previous] [Enter credentials >] [Cancel]

FIG. 8E

SYSTEMS AND METHODS FOR CONTEXTUAL AND CROSS APPLICATION THREAT DETECTION AND PREDICTION IN CLOUD APPLICATIONS

CROSS-REFERENCE TO RELATED APPLICATIONS

The current application is a continuation-in-part of U.S. patent application Ser. No. 14/523,804, filed Oct. 24, 2014, which application claims priority to U.S. Provisional Application No. 61/916,070, filed Dec. 13, 2013, the disclosures of which are incorporated by reference in their entireties.

FIELD OF THE INVENTION

The present invention relates generally to cloud computing and more specifically to monitoring, threat intelligence and managing security controls for cloud applications.

BACKGROUND OF THE INVENTION

The "cloud" has come to represent a conglomerate of remotely hosted computing solutions and the term "cloud computing" to refer to various aspects of distributed computing over a network. Various service models include infrastructure as a service (IaaS), platform as a service (PaaS), software as a service (SaaS), and network as a service (NaaS). A "cloud" can also refer to the data store and client application of a single service provider. Cloud applications connect a user's device to remote services that provide an additional functionality or capability beyond what is available solely on the device itself. Cloud application providers such as Box.com and Dropbox synchronize a user's files across different devices and providing sharing and versioning capabilities. Other cloud services such as Office 365 and Docusign facilitate document creation and management. Still other cloud providers include Salesforce.com, Amazon Web Services, and others.

SUMMARY OF THE INVENTION

Systems and methods for contextual and cross application threat detection and prediction in cloud applications in accordance with embodiments of the invention are disclosed. In one embodiment, a method for detecting threat activity in a cloud application using past activity data from cloud applications includes receiving activity data concerning actions performed by a user account associated with a user within a monitored cloud application, receiving external contextual data about the user that does not concern actions performed using the user account within the monitored cloud application, where the external contextual data is retrieved from outside of the monitored cloud application, deriving a baseline user profile using the activity data and external contextual data and associating the baseline user profile with the user account, and determining the likelihood of anomalous activity using the baseline user profile.

In a further embodiment, the activity data includes a count of the number of unique internet protocol (IP) addresses used by a user account per day.

In another embodiment, the activity data includes one or more time differences between the use of different IP addresses by a user account.

A still further embodiment also includes deriving a baseline profile associated with a user account using activity data from at least one cloud application where the activity data is associated with the user account.

In still another embodiment, the baseline profile includes a list of IP addresses and associated valid geolocations.

In a yet further embodiment, a threat is recognized when activity occurs from a geolocation that is not on the list of IP addresses and valid associated geolocations.

In yet another embodiment, the baseline profile is derived from activity data collected over a time period, where the time period is selected from the group of: from eight weeks prior to four weeks prior to a target date, from four weeks prior to one week prior to a target date, and from one week prior to a target date.

A further embodiment again also includes calculating a risk score for the user based on the baseline user profile and generating a ranking of a plurality of users in one or more the cloud applications based upon the risk scores.

In another embodiment again, the risk scores of users are used to prioritize threat remediation actions within the one or more cloud applications, which helps organizations to remediate most severe issues first.

In a further additional embodiment, the activity data includes a number of login failures for an existing valid user account.

In another additional embodiment, the activity data includes a count of login failures greater than a predetermined threshold.

In a still yet further embodiment, the activity data includes a count of number of downloads greater than a predetermined threshold.

In still yet another embodiment, the external contextual data includes travel plans for the user.

In a still further embodiment again, the external contextual data includes credit card transactions by the user.

In still another embodiment again, a system for detecting threat activity in a cloud application using past activity data from cloud applications includes memory containing an analytics application, and a processor, where the processor is configured by the analytics application to receive activity data concerning actions performed by a user account associated with a user within a monitored cloud application, receive external contextual data about the user that does not concern actions performed using the user account within the monitored cloud application, where the external contextual data is retrieved from outside of the monitored cloud application, derive a baseline user profile using the activity data and external contextual data and associating the baseline user profile with the user account, and determine the likelihood of anomalous activity using the baseline user profile.

BRIEF DESCRIPTION OF THE DRAWINGS

FIG. 8B is a user interface screen illustrating a list of risk events across different cloud applications in accordance with embodiments of the invention.

FIG. 8E is a user interface screen showing security controls for a tenant's account with a cloud application and the assignment of security control values at a security level in accordance with embodiments of the invention.

DETAILED DISCLOSURE OF THE INVENTION

Turning now to the drawings, systems and methods for cloud security monitoring and control are illustrated. Tenants are organizations whose members include users of cloud services offered by cloud providers. Users may have individual accounts with cloud providers and tenants may have enterprise accounts with cloud providers that encompass or aggregate a number of individual user accounts. In many embodiments of the invention, a cloud security provider maintains a cloud security monitoring and control system that enables tenants to view information about security controls in the various clouds that they use, review analytics reports, and configure security controls by a pre-set classification level of security. In several embodiments, the cloud security monitoring and control system analyzes information about user activity in one or more clouds using machine learning and other algorithms to perform threat detection and to provide recommendations concerning appropriate responses to different categories of threat. The analytics can include determining models of normal and/or abnormal behavior in user activity and detecting patterns of suspicious activity in one cloud or across multiple clouds. Some patterns may involve detecting the same action or different actions in multiple clouds that are associated with the same user account or IP address. Analytics may also include providing an alert and recommending remedial measures in the cloud(s) in which suspicious activity is detected and/or remedial measures to be taken in clouds other than those showing suspicious activity. Systems and methods for collecting and analyzing information from cloud services are discussed below.

System Architecture

A system for cloud security monitoring and control in accordance with embodiments of the invention includes multiple components that may be located on a single hardware platform or on multiple hardware platforms that are in communication with each other. Components can include software applications and/or modules that configure a server or other computing device to perform processes for cloud discovery and management as will be discussed further below.

Figure 1:
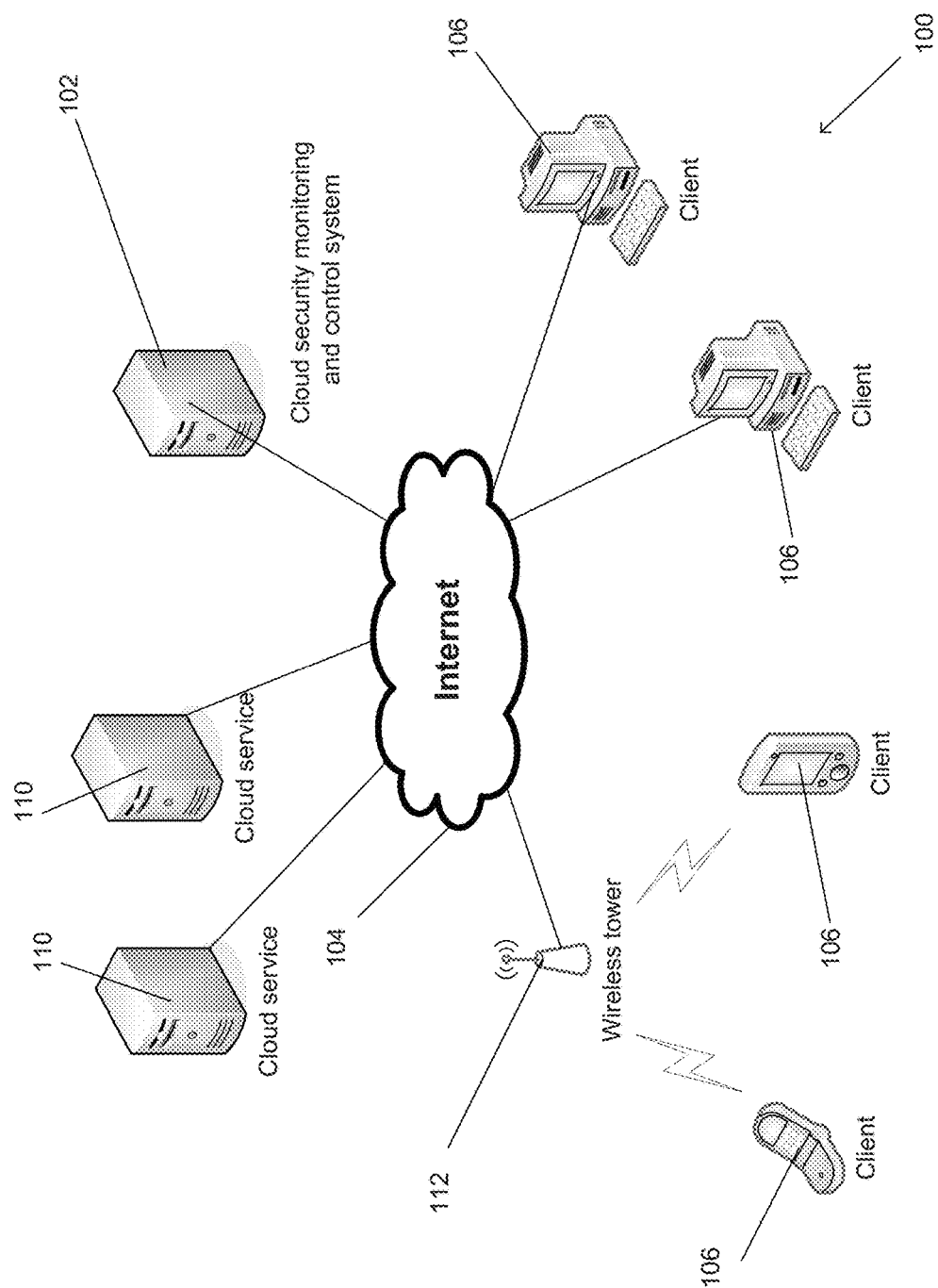
FIG. 1 is a system overview illustrating devices and cloud application service providers that can interact with a cloud security monitoring and control service in accordance with an embodiment of the invention.

A system 100 including a cloud security monitoring and control system 102, client devices 106 that can be used to access the cloud security system 102, and cloud services 110 to be monitored in accordance with embodiments of the invention is illustrated in FIG. 1. The system 100 includes a number of different types of client devices 106 that each has the capability to communicate over a network. The client devices 106 communicate with the cloud security monitoring and control service 102 and present a user interface for interacting with the service. The cloud security and control system 102 can communicate with cloud application services 110 to retrieve security configurations, application data, and other information and set security controls as will be discussed further below.

Figure 2:
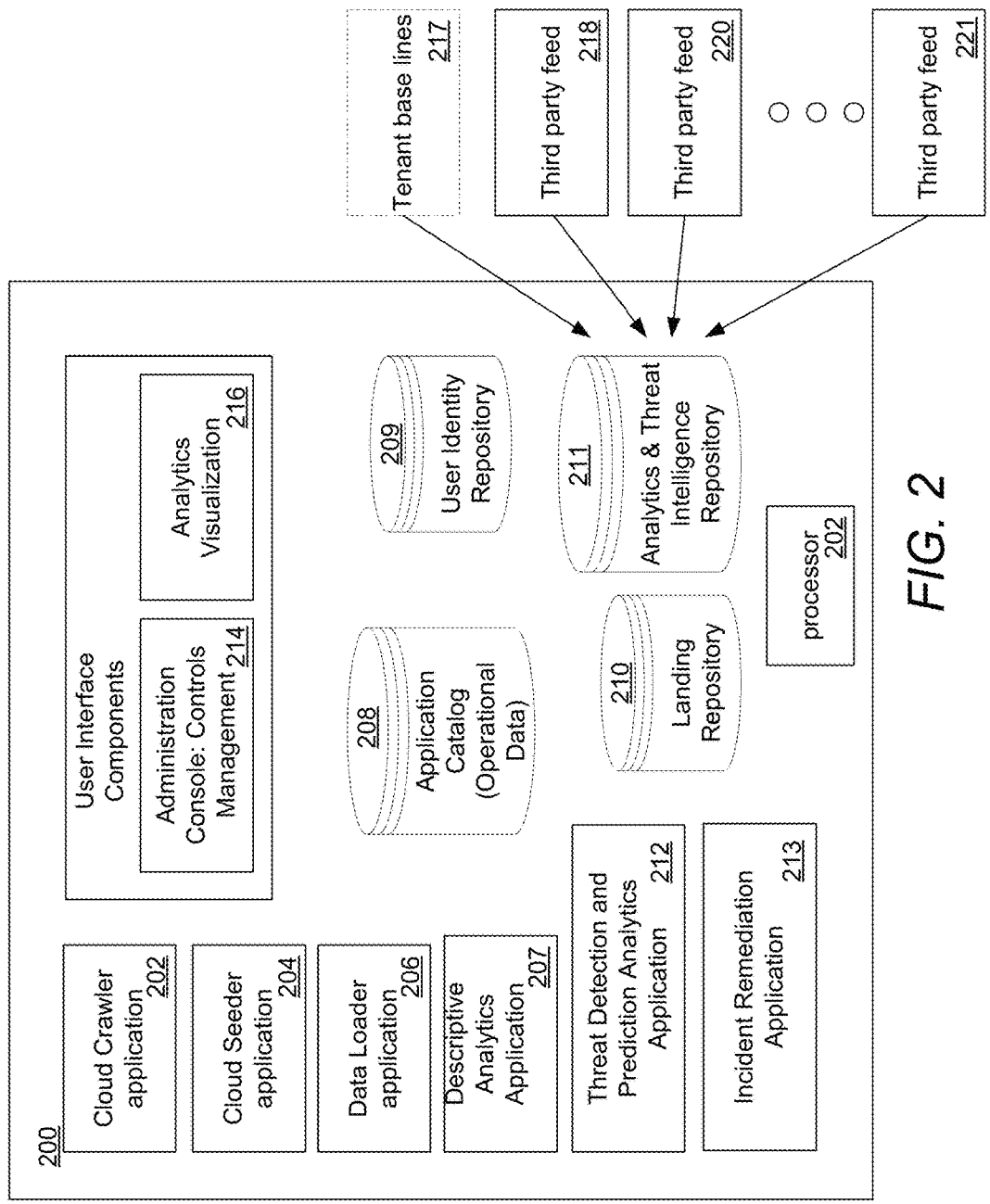
FIG. 2 is a system overview illustrating a cloud security monitoring and control system in accordance with an embodiment of the invention.

In many embodiments of the invention, a system for cloud security includes cloud management applications executing on a hardware platform, user interface components, and data warehouses stored on a hardware platform. A system for cloud security in accordance with embodiments of the invention is illustrated in FIG. 2. Cloud management applications in the system 200 can include a cloud crawler 202, a cloud seeder 204, and a data loader 206. As will be discussed in greater detail further below, a cloud crawler application 202 can retrieve information about security controls from cloud providers, a cloud seeder application 204 can modify the security controls of a tenant account with a cloud provider to reflect a desired security posture, and a data loader application 206 can retrieve activity information on a tenant's account with a cloud provider and generates analytics.

In several embodiments, data retrieved by the cloud crawler application 202 is entered into an application catalog database 208 and data retrieved by the data loader application 206 is entered into a landing repository 210 and/or analytics and threat intelligence repository database 211. The data entered into a landing repository 210 may be in different formats and/or have different ranges of values—this data may be reformatted and/or structured before being moved to the analytics repository 211. The data concerning activity information in the analytics repository 211 can be utilized to generate reports that may be presented visually to a system administrator via a user interface and to generate analytics for determining threat level, detecting specific threats, and predicting potential threats.

The aggregation of activity information in the analytics repository 211 concerning access patterns and other event statistics enables the system to establish baselines of user behavior. Machine learning techniques can then be applied to detect threats and provide recommendations concerning how to respond to threats. Threat models can be developed to detect threats that are known or unknown or emerging. Threats can also be identified by comparing activity data with external threat intelligence information, such as information provided by third-party providers, as will be discussed further below.

The accounts of a particular user in different cloud applications (e.g., different user identities) can be associated together in a user identity repository 209. The user identity repository 209 and/or other memory in the cloud security system can store information concerning tenant accounts and user accounts associated with each tenant account. A user belonging to a tenant organization may have user accounts with various cloud applications. The tenant organization may also have a tenant account with the cloud applications that exercises management authority over the user accounts of users belonging to the organization. The user accounts of a user are typically associated with the tenant account of the tenant to which the user belongs. The association of user accounts to tenant accounts may be used in various ways in accordance with embodiments of the invention including retrieving information about the user activity of users associated with a tenant. As will be discussed further below, a tenant account's credentials may be used to log into cloud application services to retrieve activity data concerning user accounts that are associated with the tenant account.

As will be discussed in greater detail below, the user identity repository 209 can also be utilized to facilitate user tracking and profile across multiple cloud applications. In addition, collecting information about user behavior across multiple cloud services enables the system to, when a threat is detected based upon behavior on one or more cloud services, preemptively alert a system administrator with respect to threats on other cloud services and/or proactively secure other services on which a user maintains data by applying remedial measures, such as adding additional steps to authentication, changing passwords, blocking a particular IP address or addresses, blocking email messages or senders, or locking accounts.

In several embodiments of the invention, the system 200 includes applications or software modules to perform analytics on collected data as will be discussed in greater detail further below. The applications or software modules may be stored in volatile or non-volatile memory and, when executed, configure the processor 201 to perform certain functions or processes. These applications can include a threat detection and prediction analytics application 212 and/or descriptive analytics application 207. The threat detection and prediction analytics application 212 can generate analytics using machine learning and other algorithms to identify and predict security threats from patterns of activity and behavioral models. The descriptive analytics application 207 can generate analytics such as, but not limited to, statistics on users, user activity, and resources. Analytics may be performed using data stored in the analytics and threat intelligence repository 211.

As will be discussed further below, embodiments of the invention may include remediation functions that provide manual and/or automated processes in response to threats. In some embodiments, analytics can utilize information received from tenant systems that describes threat intelligence provided by the tenant. These sources, that can be referred to as tenant base lines 217, can include information such as, but not limited to, specific IP addresses to watch or block, email addresses to watch or block, vulnerable browsers or versions thereof, and vulnerable mobile devices or versions of mobile hardware or software. In additional embodiments, analytics can utilize information received from external third party feeds 218, 220, and 221 to augment the threat intelligence by providing external information of security threats such as, but not limited to, identification of infected node points, malicious activity from a particular source IP address, malware infected email messages, vulnerable web browser versions, and known attacks on clouds.

The incident remediation application 213 can be utilized to coordinate and/or perform remediation actions in response to detected threats. It may be called when a recommended remediation action is presented and selected in an alert. The incident remediation application 213 may perform the selected remediation action or instruct another application, such as a cloud seeder application 204 to perform the selected remediation action. When the selected remediation action is to be manually performed or is external to the cloud security system, the incident remediation application 213 may track the status of the remediation action and whether it is complete. The incident remediation application 213 can be used to save the results of a manual or automated remediation action into memory. In several embodiments, a selected remediation action is to be performed by a system external to the cloud security system, such as by a third-party's or a tenant's incident remediation system. In such cases, the incident remediation application 213 may instruct or invoke the third-party's or tenant's incident remediation system to perform the action using an automated integration process.

The cloud seeder application 204 can be utilized to implement security policies by setting security controls within a tenant's accounts in various cloud applications. As will be discussed in greater detail further below, a cloud seeder may set security controls in various conditions such as, but not limited to, part of remediation of a threat or on call by a system user.

In further embodiments of the invention, user interface components include an administration console 214 that provides controls management for a user to set the security controls for one or more clouds, and an analytics visualization console 216 for viewing analytics generated by the system. As will be discussed in greater detail further below, the data in the data warehouses can be used to generate the information and reports shown in the user interface. The use of cloud management applications to retrieve security configuration data from cloud applications is discussed below.

Cloud Crawler

Figure 3:
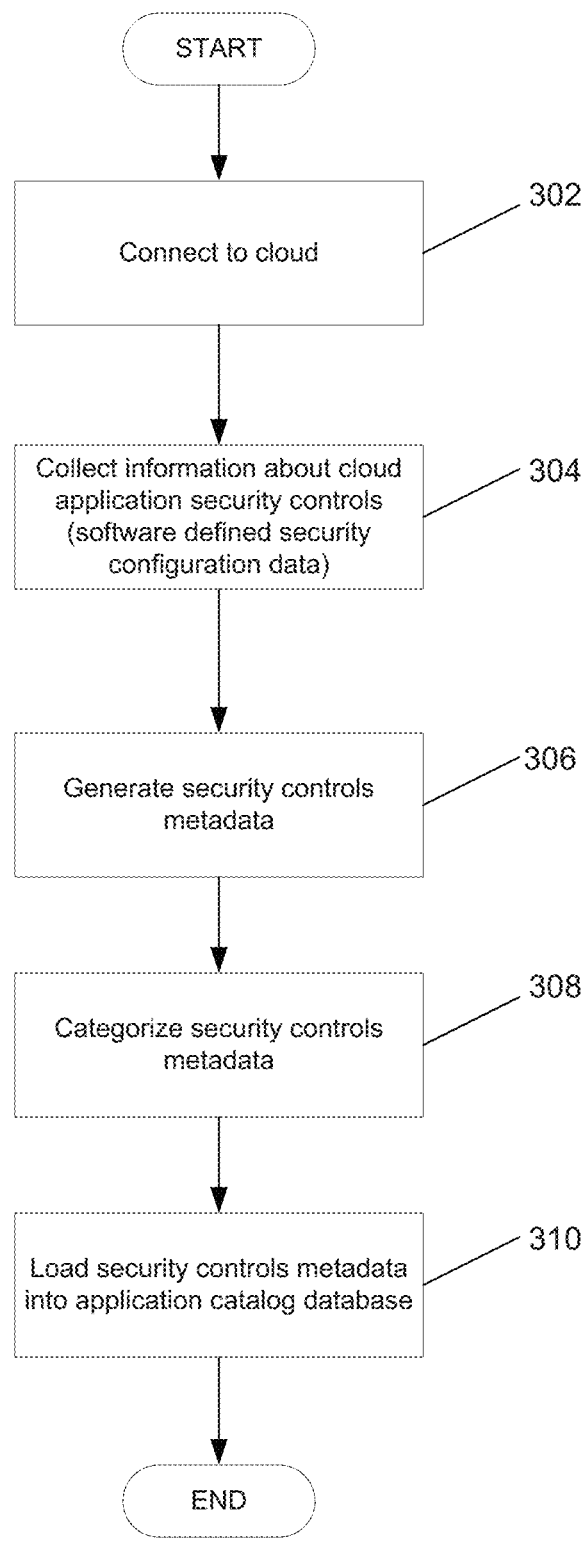
FIG. 3 is a flow chart illustrating a process for retrieving software defined security configuration data from a cloud service in accordance with an embodiment of the invention.

In many embodiments of the invention, a cloud crawler application retrieves software defined security configuration data from cloud services. Software defined security configuration data describes the configuration of security controls in a particular cloud service. Security controls are mechanisms that restrict access to the application and data housed by the cloud. Software defined security configuration data can include data describing: roles that are defined for users, groups and grouping of users, encryption keys, tokens, access controls, permissions, configurations, type of authentication policy, mobile access policy, and many other types of security controls. A process for retrieving software defined security configuration data from cloud services is illustrated in FIG. 3.

The process includes connecting (302) to the cloud. The cloud may require authorization or some other manifestation of consent for access to the system and internal data. Authorization may be provided by a token (such as using the OAuth open standard for authorization) or by credentials (such as a user name and password). One skilled in the art will recognize that there are various other techniques that can be utilized in authorizing access to a cloud provider's system and data. The connection may also include providing a service URL (universal resource locator).

The process further includes collecting (304) software defined security configuration data about the cloud application's security controls. The software defined security configuration data can be collected by utilizing an API (application programming interface) made available by the cloud application. API's and classes of API's that may be utilized in accordance with embodiments may include REST (Representational State Transfer), J2EE (Java 2 Platform, Enterprise Edition), SOAP (Simple Object Access Protocol), and native programmatic methods (such as native application API's for Java). The information could also be requested using other techniques including scripting languages (such as Python and PHP), deployment descriptors, log files, database connectivity through JDBC (Java Database Connectivity) or REST, and resident applications (cloud beacons) as will be discussed further below. The information that is sent or received can be represented in a variety of formats including, but not limited to, JSON (JavaScript Object Notation), XML (Extensible Markup Language), and CSV (Comma Separated Values). One skilled in the art will recognize that any of a variety of formats may be utilized in accordance with embodiments of the invention as suitable to a specific application. Table 1 below provides a partial list of security controls and the access that is supported by the cloud applications Box and Amazon Web Services. Table 2 provides a partial list of security controls and supported access for Salesforce.com.

TABLE 1

| Security Controls | Support in Box | Support in Amazon Web Services (AWS) |
| --- | --- | --- |
| Users/Group Management | REST (Representational State Transfer) API | AWS IAM (Identity and Access Management) APIs |
| Credentials and Identifiers | N/A | Secure and monitor Accounts, tokens, keys etc |
| Login/Logout Events | REST API | AWS CloudTrail - Events API and Log files |
| IP address of the clients | REST API | AWS CloudTrail - Events API and Log files |
| Device (iphone, ipad etc) used by the clients | REST API | AWS CloudTrail - Events API and Log files |
| Password Policies | REST API | AWS IAM policies |
| Resource Access Permissions | Resources: Files, Folders Actions: Editing, Preview, upload, collaboration events | Resources: EC2, S3, EBS Actions: Create, Access, Restart, Terminate, etc. IP address based access controls |
| Restrict or limit Mobile access | Limit users from saving content for offline access | AWS IAM policies |
| Roles | BOX has pre-defined admin roles | Roles can be created using pre-defined policies |

TABLE 2

| Security Controls | Support in Salesforce.com |
| --- | --- |
| Users/Group Management | SalesForce User/Group/Profiles APIs |
| Credentials and Identifiers | APIs: Setup changes |
| Login/Logout Events | APIs: Audit activity |
| IP address of the clients | APIs: Audit activity |
| Device (iphone, ipad etc) used by the clients | API to manage Setup changes |
| Password Policies | APIs: Setup changes |
| Resource Access Permissions | Salesforce object monitoring using object history |

TABLE 2-continued

| Security Controls | Support in Salesforce.com |
| --- | --- |
| Restrict or limit Mobile access | APIs to manage Setup changes |
| Roles | Salesforce Profiles |

The software defined security configuration data received about a cloud application's security controls can be used to generate (306) security controls metadata, that is, normalized descriptors for entering the information into a common database. The security controls metadata is categorized (308) (mapped into categories) and indexed. The categorization may comply with a standard specified by a security organization and/or may be certified and/or audited by a third party. In addition, security controls metadata and/or the categorization of metadata may be formulated around the requirements of a particular regulation or standard. For example, regulations and standards such as the Health Insurance Portability and Accountability Act (HIPAA), Sarbanes-Oxley Act, FedRAMP, and Payment Card Industry Data Security Standard (PCI DSS) may require reporting and audit trails. Security controls metadata can be formatted in a way to display the types of information required by the regulations and standards and facilitate the generation of reports needed.

The security controls metadata is entered (310) into an application catalog database. In many embodiments of the invention, the application catalog database is a Cassandra database. In other embodiments, the application catalog database is implemented in other types of databases appropriate to the application. One of ordinary skill in the art will recognize that any of a variety of databases can be used to store an application catalog in accordance with embodiments of the invention for later retrieval, report generation, and analytics generation as will be discussed further below.

A specific process for discovering and storing security controls metadata in accordance with an embodiment of the invention is discussed above. Any of a variety of processes for retrieving software defined security configuration data and generating security controls metadata can be utilized in accordance with embodiments of the invention. One skilled in the art will recognize that the number and types of controls and the mechanisms for retrieving software defined security configuration data may vary in different embodiments of the invention as supported by different cloud applications. For example, other cloud applications such as Office 365, GitHub, Workday, and various Google apps may be supported using retrieval mechanisms specific to the application. Furthermore, processes for retrieving software defined security configuration data can be automated or manual based on target cloud provider support.

Controls Management

In many embodiments of the invention, a controls management platform provides a user with a normalized view of controls for multiple clouds. The platform can include a user interface that displays a simplified view of controls for different clouds on the same screen. Information provided to the controls management platform can be retrieved from an application catalog database using metadata based schema mapping. The platform can be used to assign consistent access policies across clouds. Controls can be displayed and/or set according to specified classifiers, such as, but not limited to: standard, stringent, custom. A higher level classification corresponds to more stringent controls. In several embodiments, classification and/or designation of security controls complies with criteria specified by organizations such as the National Institute of Standards and Technology (NIST), International Organization for Standardization (ISO), and/or Payment Card Industry Data Security Standard (PCI DSS) and/or a specific certification offered by one such organization. In several embodiments of the invention, the controls management platform can also provide for plug-in interfaces to integrate with SaaS, PaaS, and native applications.

Figure 8A:
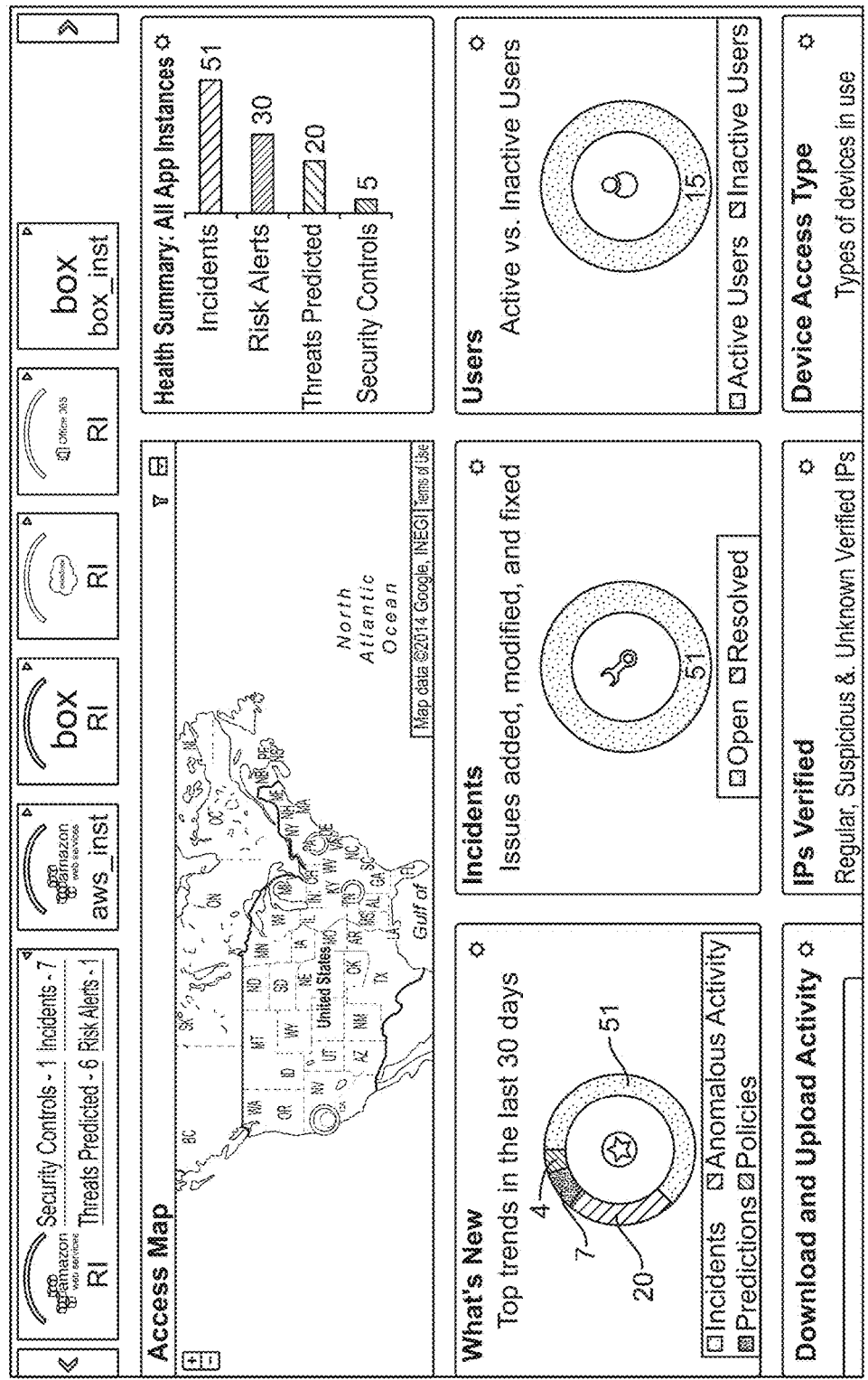
FIG. 8A is a user interface screen illustrating a tenant dashboard view of a controls management platform user interface in accordance with embodiments of the invention.

A controls management platform user interface may display key security indicators in a library format with risk factors that are color coded (such as red, green, yellow). Other statistics or metrics may be displayed such as, but not limited to, user logins attempts, groups with most added users, most deleted files, users with the most deleted files, and users downloading the most files. Some types of information may be specific to a particular cloud application provider, such as Salesforce.com showing who is downloading opportunity/budget data, contracts, or contacts. In several embodiments of the invention, a user interface provides a unified view of security controls for a tenant's registered cloud applications. The user interface may display values set for any or all security controls set for different cloud applications, as well as deviations of the current values from values associated with predetermined policies or configurations. A security policy may include predetermined desirable or recommended values for security controls as will be discussed further below. A user interface may also display events and alerts concerning detected security threats and risks and tools to address them as will be discussed further below. A user interface can provide control over setting security controls values, such as by pushing a security policy using a cloud seeder as will be discussed further below. A tenant's dashboard view of a controls management platform user interface in accordance with embodiments of the invention is illustrated in FIG. 8A. The dashboard view can display high-level information such as a map of IP addresses of user accounts associated with the tenant's account that have accessed cloud applications, number of risk alerts and predicted threats, number of inactive and active users, number of open and closed incidents, etc. The collection of activity data from cloud application providers is described next.

Cloud Data Loader

Figure 4:
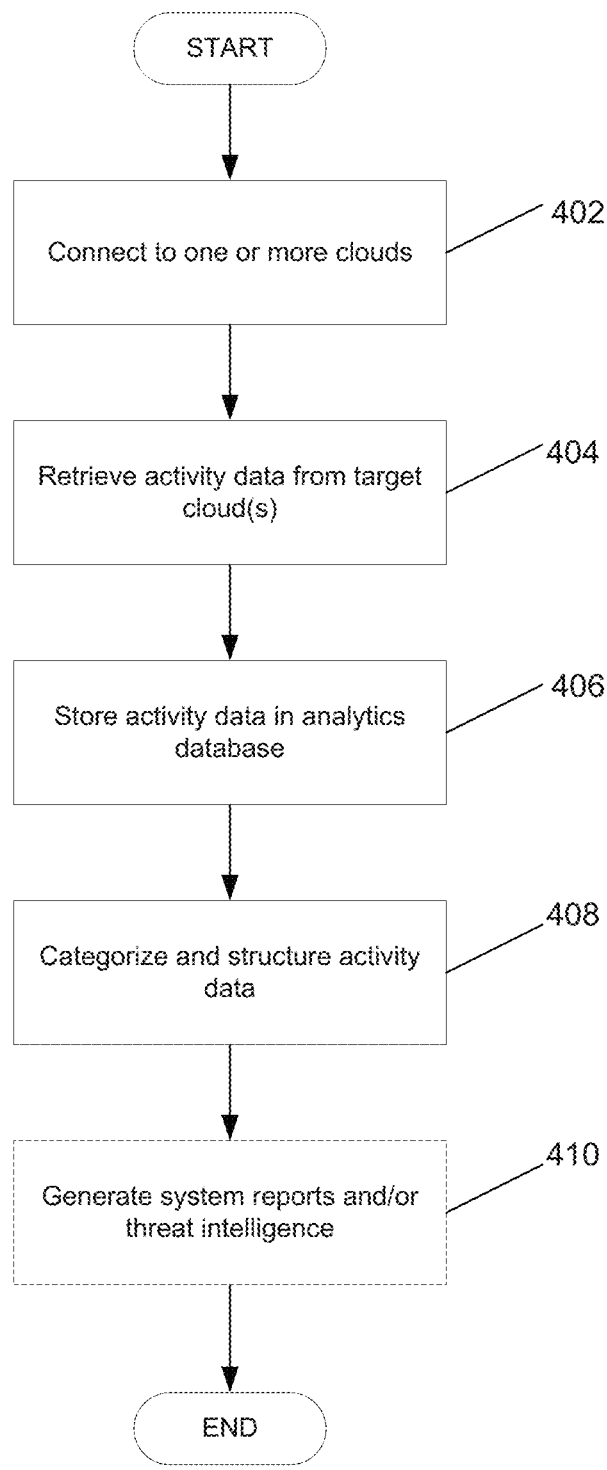
FIG. 4 is a flow chart illustrating a process for collecting activity data from a cloud service in accordance with an embodiment of the invention.

In many embodiments of the invention, a cloud data loader application configures a computing device to collect activity data from a cloud service about a tenant's user activity, security configuration, and other related pieces of information. A process for collecting activity data from a cloud service in accordance with embodiments of the invention is illustrated in FIG. 4.

The process includes connecting (402) to one or more clouds and collecting (404) activity data from the clouds. In many embodiments, the connection is made over an encrypted communication channel. In further embodiments, the connection must be authenticated by a token or using login credentials as in the connection made with a cloud crawler application discussed further above. In several embodiments of the invention, the collection is scheduled to occur periodically (e.g., every 4 hours or every 6 hours). In many embodiments, the schedule for collection is configurable by the tenant. In further embodiments, data is collected and retrieved in real time as events occur utilizing a real-time computation system such as, for example, Storm. The system may be configured to designate certain events or activity as high risk events for retrieval near real-time outside scheduled retrieval.

Activity data can include various types of information made accessible by a remotely hosted cloud application system to a system external to the cloud application system when the external system holds the proper credentials, which may be issued by the cloud application system or another authorizing entity. Activity data associated with user accounts can include information relating to the use of and/or actions taken with a user account at a cloud application. Activity data can include sources of information such as a user log(s) or audit trail(s). More specific types of activity data can include, but are not limited to, login and logout statistics (including attempts and successes), IP addresses used to access the application, devices used to access the application, and cloud resources that were accessed (including, but not limited to, files and folders in a file management cloud application [such as Box], employees and contractors in a human resource cloud application [such as Workday], and contacts and accounts in a customer relationship management cloud application [such as Salesforce]). Activity data can include the user account or other user identifier for the user associated with the events or statistics. Activity data can include information about system status or activity of a cloud application system such as, but not limited to, server activity, server reboots, security keys used by a server, and system credentials, where this information is visible or accessible to a system using authorized credentials.

Activity data may also include information about the security configuration of a tenant (and associated users) account. Security configuration can include the values to which security controls (discussed further above) for a tenant (and/or associated users) are set.

In some embodiments, certain events are considered high risk and activity data related to such events are retrieved near real-time outside of a scheduled interval.

The retrieved activity data is stored (406) in an analytics and threat intelligence repository database 211. The analytics and threat intelligence repository database 211 may be any database or data repository with query capability. In several embodiments of the invention, the analytics and threat intelligence repository database 211 is built in a NoSQL based infrastructure such as Cassandra or other distributed data processing system, although any data warehouse infrastructure may be utilized as appropriate for the application. In some embodiments, the data is first entered into a landing repository 210 and reformatted and/or structured before being moved to an analytics repository 211.

In some embodiments of the invention, the data may be received in different formats that are utilized by different cloud applications. For example, the data may be formatted in JSON (JavaScript Object Notation) or other data interchange formats, or may be available as log files or database entries. In further embodiments, the process includes normalizing (408) the data and reformatting the data into a common format for storage in and retrieval from the analytics and threat intelligence repository database 211. Reformatting the data may include categorizing and structuring the data into the common format. In several embodiments of the invention, the database is adaptive to structural changes and new values by running automated processes to check for changed data. In some embodiments, a cloud crawler application (as discussed further above) recognizes differences in the structure or values of the data retrieved and the changes are implemented in the application catalog database 208 and/or analytics and threat intelligence repository database 211. System reports may be pre-generated (410) by jobs that are scheduled to run on the data set. Specific processes for utilizing a cloud loader application to collect activity data are discussed above. Any of a variety of processes can be used for collecting activity data in accordance with embodiments of the invention. Reports that can be pre-generated or generated on demand by a system user or administrator in accordance with embodiments of the invention are discussed below.

Reports

Data stored in an application catalog database and/or analytics and threat intelligence repository database 211 can be used to generate a variety of reports. Categories of reports can include: authentication and authorization, network and device, systems and change data, resource access and availability, malware activity, and failures and critical errors. Reports can be based on various attributes such as, but not limited to, per application, per user, per secured resource, and per device used for access. Reports may highlight recent changes such as updated features in a cloud application or newly modified policies. Reports may be pre-generated by scheduled jobs (e.g., for performance reasons) or may be requested by a user or administrator.

In various embodiments of the invention, reports include analytics generated on the data. Analytics may utilize Apache Software Foundation technologies such as Hadoop, Hive, Spark, and Mahout or other features as available in the data storage framework used. Several embodiments utilize the R programming language to generate analytics. In further embodiments, the generation of analytics includes the use of machine learning algorithms, proprietary algorithms, and/or external threat intelligence from external commercial sources such as FireEye and Norse or public threat intelligence communities such as Zeus and Tor. Techniques for generating analytics in accordance with embodiments of the invention are discussed below.

Analytics and Security Intelligence

Figure 5:
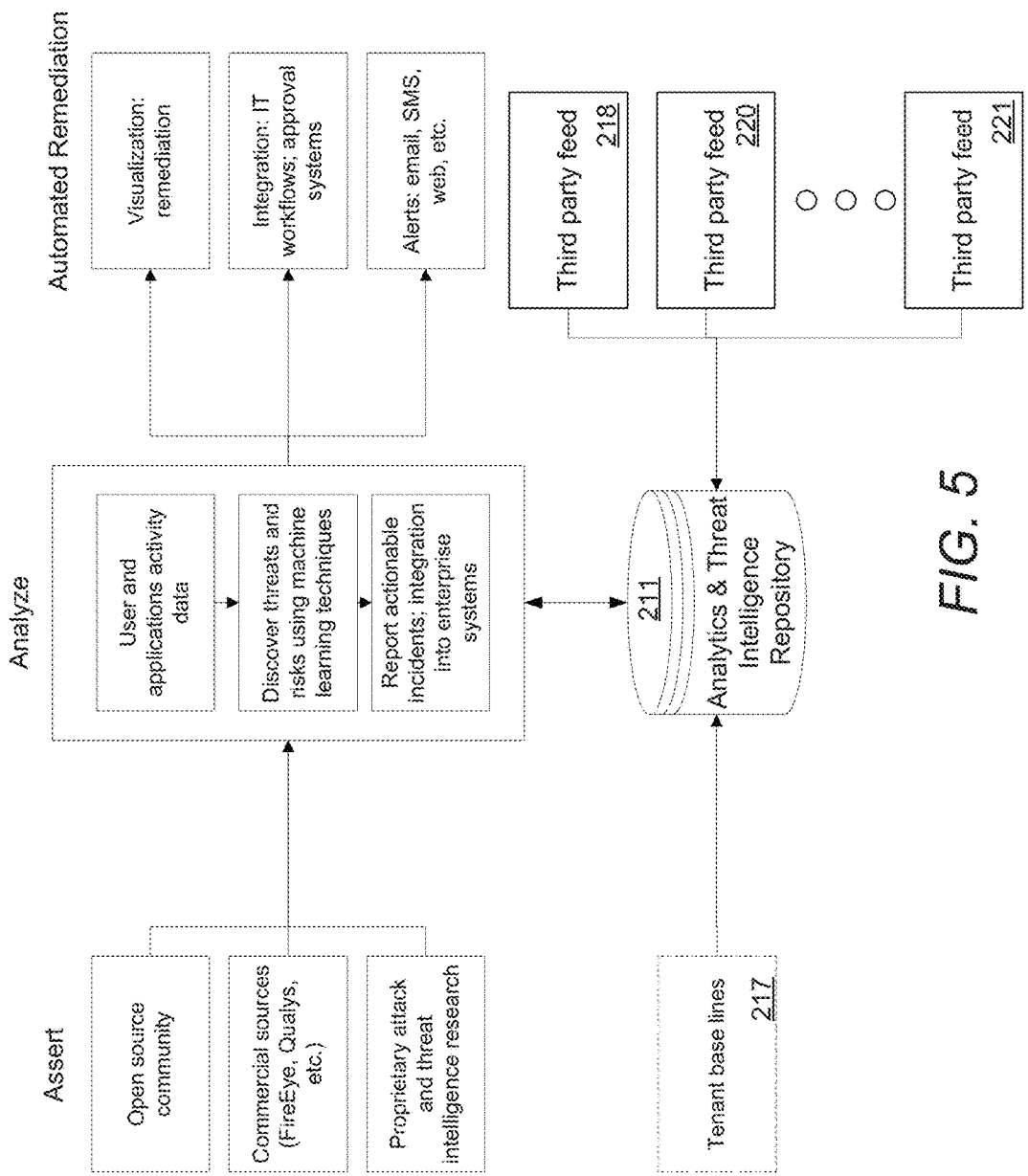
FIG. 5 conceptually illustrates components of a threat intelligence platform for generating analytics in accordance with an embodiment of the invention.

A cloud security monitoring and control system in accordance with embodiments of the invention can generate analytics using collected data. Analytics may be generated by an analytics process and/or an analytics module referred to as an analytics engine. An overview of generating analytics using components of a threat intelligence platform in accordance with embodiments of the invention is illustrated in FIG. 5.

One class of analytics that may be generated is descriptive or statistical analytics. Statistical data can be generated using a pre-defined set of system queries, such as, but not limited to, MapReduce jobs and Spark and Apache Hive queries. Descriptive analytics can be generated either for a single application or across multiple applications using correlation techniques. Examples of reports that can be generated include, but are not limited to, login statistics (e.g., users with the most failed logins, IP address based login history including consideration of IP reputation, geo-location, and other factors), user statistics (e.g., users with the most resources [files, EC2 machines, etc.], entitlements across clouds, number of changed passwords), activity statistics (e.g., activity of a user across clouds), statistics on key rotation (e.g., whether SSH keys have been rotated within the last 30 days), and resource statistics (e.g., number of folders, files downloaded by users, files downloaded by roaming or mobile users). Trends may be identified, such as login activity within a certain time period, password related support issues based on past history of such issues, or identifying types of mobile devices which see the most activity within a certain time period. Data in a report can be displayed on a user interface as an event viewer showing a "wall" of events along with actions that a user can take in response to or to remediate an event. Alerts can be constructed based on pre-defined rules that can include specific events and thresholds.

Another class of analytics that can be generated is predictive and heuristic analytics. These may incorporate machine learning algorithms to generate threat models, such as, but not limited to, deviations from base line expectations, rare and infrequent events, and behavior analytics to derive suspicious behavior of a user. Algorithms and profiles can be trained to intelligently predict whether an unusual behavior is a security risk. Third party feeds from providers such as, but not limited to, MaxMind, FireEye, Qualys, Mandiant, AlienVault, and Norse STIX can be integrated to augment the threat intelligence by providing external information of and relating to potential security threats such as, but not limited to, IP (Internet Protocol) address reputation, malware, identification of infected node points, vulnerable web browser versions, use of proxy or VPN server by a user, and known attacks on clouds. In several embodiments, threat information is expressed in the Structured Threat Information eXpression (STIX) data format. For example, one or more services may contribute information concerning a particular IP address, such as a reputation (e.g., known for having software vulnerabilities, a host of malicious software, or source of attacks) and/or a geographic location associated with the IP address. This information can be combined with retrieved activity data involving the IP address, such as what time logins were attempted from that IP address, and information derived from activity data, such as how far apart the logins attempts were. These factors can be used to determine a "login velocity" metric. Metrics can be determined for other activities such as file access, sales transactions, or instances of virtual machines.

In many embodiments of the invention, various types of algorithms can be particularly useful for analyzing the data. Decision tree, time series, naive Bayes analysis, and techniques used to build user behavior profiles are examples of machine learning techniques that can be utilized to generate predictions based on patterns of suspicious activity and/or external data feeds. Techniques such as clustering can be used to detect outliers and anomalous activity. For example, a threat can be identified based on an account accessing one or more files or failing a series of login attempts from an IP address that is flagged (by a third party feed or otherwise) as malicious. In a similar way, a threat can also be based on different patterns of activity in one cloud or across multiple clouds over a series of time. As discussed further above, activity data from different clouds may be in different formats or with different possible values or ranges of values. Normalizing the data in the processes discussed above may include reformatting the data such that it is comparable, have the same meaning, and/or bear the same significance and relevance between different clouds. Thus, algorithms can aggregate and compare data from different clouds in meaningful ways. For example, a series of failed logins with a particular user account in one cloud may be deemed not to be a threat. However, a series of failed logins with user accounts associated with a user across multiple clouds may indicate a concerted effort to crack the user's password and therefore set off an alarm. Clustering and regression algorithms can be used to categorize data and find common patterns. For example, a clustering algorithm can put data into clusters by aggregating all entries of users logging in from a mobile device. Predictive analytics can also include identifying threats based on activity such as a user not accessing a particular cloud application in several months and then showing high activity in the next month or a user downloading one file every week for the past several weeks, demonstrating a potential advanced persistent threat (APT) scenario. In several embodiments of the invention, data collected over time is used to build models of normal behavior (e.g., patterns of events and activity) and flag behavior that deviates from normal as abnormal behavior. After one or more flagged event or activity is characterized as a true or false positive (e.g., by user feedback), the information can be provided back to one or more machine learning algorithms to automatically modify parameters of the system. Thus, machine learning algorithms can be utilized in at least the ways discussed above to make recommendations and reduce false alarms (false positives). Activity data collected from various parameters over period of time can be used with machine learning algorithms to generate patterns referred to as user behavior profiles. The activity data can include contextual information such as IP address and geographic location.

Algorithms for association rule learning can be used to generate recommendations. In several embodiments of the invention, profile linking algorithms are used to link activities across multiple cloud applications by finding cross application correlation. A single user can be identified across multiple clouds using one or more attributes or identification factors, such as a primary user identifier (ID) that is commonly used across the clouds or a single sign-on (SSO) authentication mechanism (e.g., Active Directory, Okta). Correlation of activities across applications can include finding users with a first entitlement in a first cloud application that have a second entitlement in a second cloud application, users logged into two cloud applications simultaneously from different IP addresses, users who have several failed login attempts and then change their password, and common users with numerous failed logins in two cloud applications.

In many embodiments of the invention, a user identity repository 109 can be utilized to facilitate user tracking and profile across multiple cloud applications. A particular user's accounts in different cloud applications may be linked by associating together the user identifier associated with the accounts (e.g., jdoe, john.doe, etc.), by a primary (universal) user identifier or SSO mechanism as mentioned above, or other method. A user identity repository 109 can contain information relating together the accounts of each user associated with a tenant. A user who utilizes multiple cloud application accounts that under the control or ownership of a tenant may be referred to as an "enterprise user."

In several embodiments of the invention, a recommendation engine tracks user activity for anomalous behavior to detect attacks and unknown threats. The recommendation engine can track user activity across multiple clouds for suspicious events. Events can include pre-defined at-risk operations (e.g., downloading a file containing credit card numbers, copying encryption keys, elevating privileges of a normal user). An alarm can be sounded with details of the event and recommendations for remediation.

Dynamic policy based alerts can be generated for events pertaining to a specific user/employee. A process can monitor activity data associated with the specific user and generate a customized alert for specific actions taken by the user.

In many embodiments of the invention, an algorithm is designed to simulate normal user activities using user activity data in the analytics and threat intelligence repository database 211. The simulation can be used to train other machine learning algorithms to learn normal behavior of a user in the system. In general, a particular security issue may not always repeat, and hence may not be detected by a purely supervised algorithm. However, techniques such as outlier detection establish a baseline that is useful for detecting anomalous activities. Such anomalous activities along with contextual threat intelligence can provide more accurate prediction of threats with low prediction errors.

In further embodiments of the invention, analytics can be used to detect security controls drift, which can refer to the changing of one or more security controls in a seemingly arbitrary manner that can increase security risks. A risk event can be generated in response to the change of one or more security controls in one or more cloud applications and actionable intelligence associated with the risk event. As with other types of events, an alert may be sent to a tenant, tenant system, or other monitoring entity. For example, a tenant's password policy in a cloud application may have been changed to impose fewer requirements (e.g., type and/or number of characters). This may generate a risk event and alert to recommend that the password policy be changed back to the original password policy.

Alerts concerning any of the events discussed above can be shown on a user interface such as a controls management platform discussed further above. An alert can include information about the detected event such as, but not limited to, an event identifier, date, time, risk level, event category, user account and/or security controls associated with the event, cloud application associated with the event, description of the event, remediation type (e.g., manual or automatic), and/or event status (e.g., open, closed). A user interface showing a list of risk events across different cloud applications associated with a tenant's account in accordance with embodiments of the invention is illustrated in FIG. 8B. Information to be displayed about each risk event can include an identifier (ID), affected cloud application and instance, category, priority, date and time, description, recommended remediation type, and status. Each risk event may also have a user-selectable action, such as editing, deleting, marking status complete, and/or performing a remediation action. Selection of a remediation action may invoke an application such as the incident remediation application 213 and/or cloud seeder application 204 to perform the selected remediation.

Figure 8C:
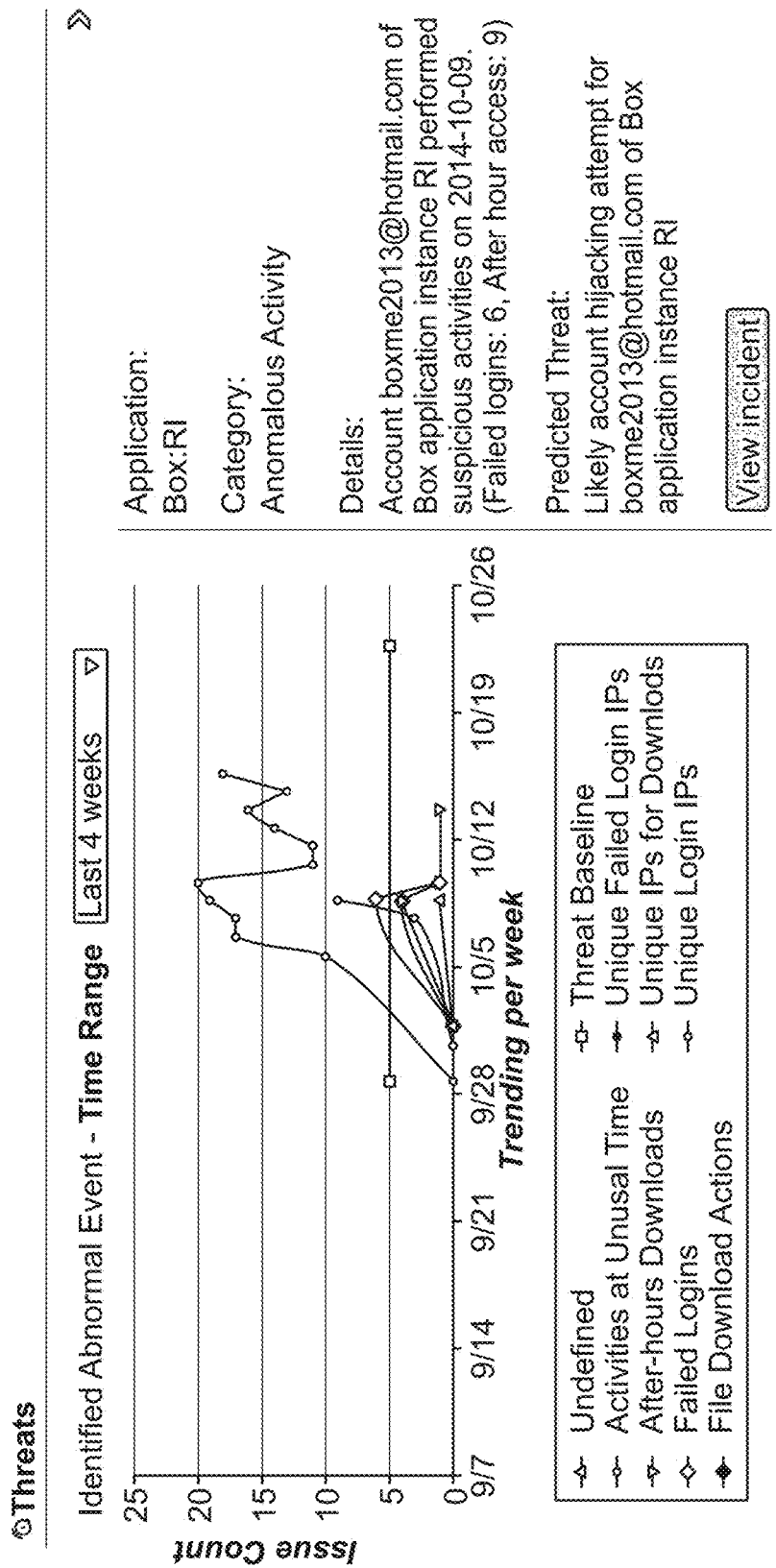
FIG. 8C is a user interface screen displaying a graphical chart of events in accordance with embodiments of the invention.
Figure 8C:
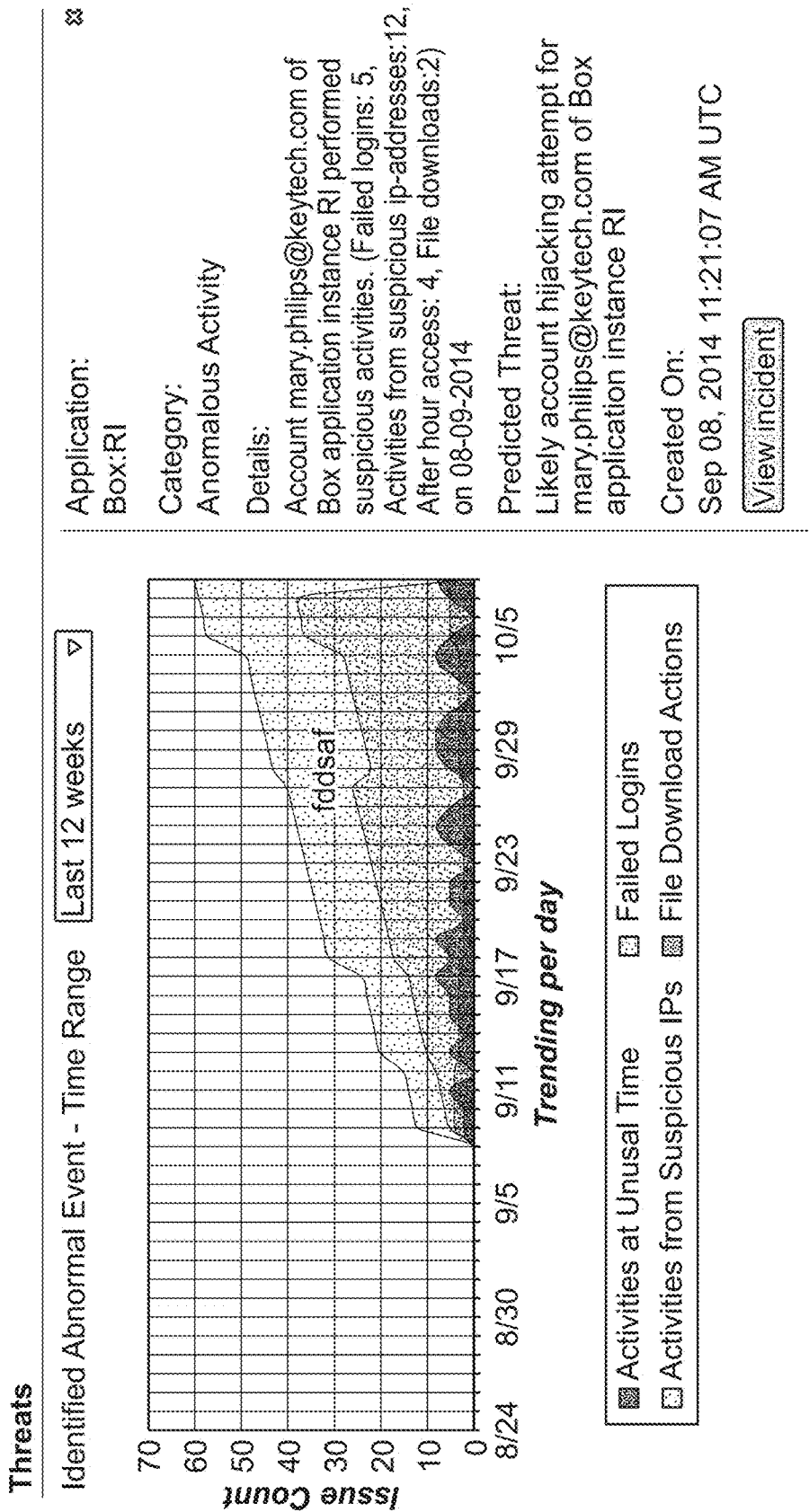

Counts of events in different event categories over time can be graphically illustrated in a chart. A user interface displaying a chart of events in accordance with embodiments of the invention is illustrated in FIG. 8C. The chart displays a count of events by date in each of the color coded categories such as activities at an unusual time, after-hours downloads, failed logins, etc. The visual representation (e.g., a line) of an event category can be toggled on and off.

Figure 8D:
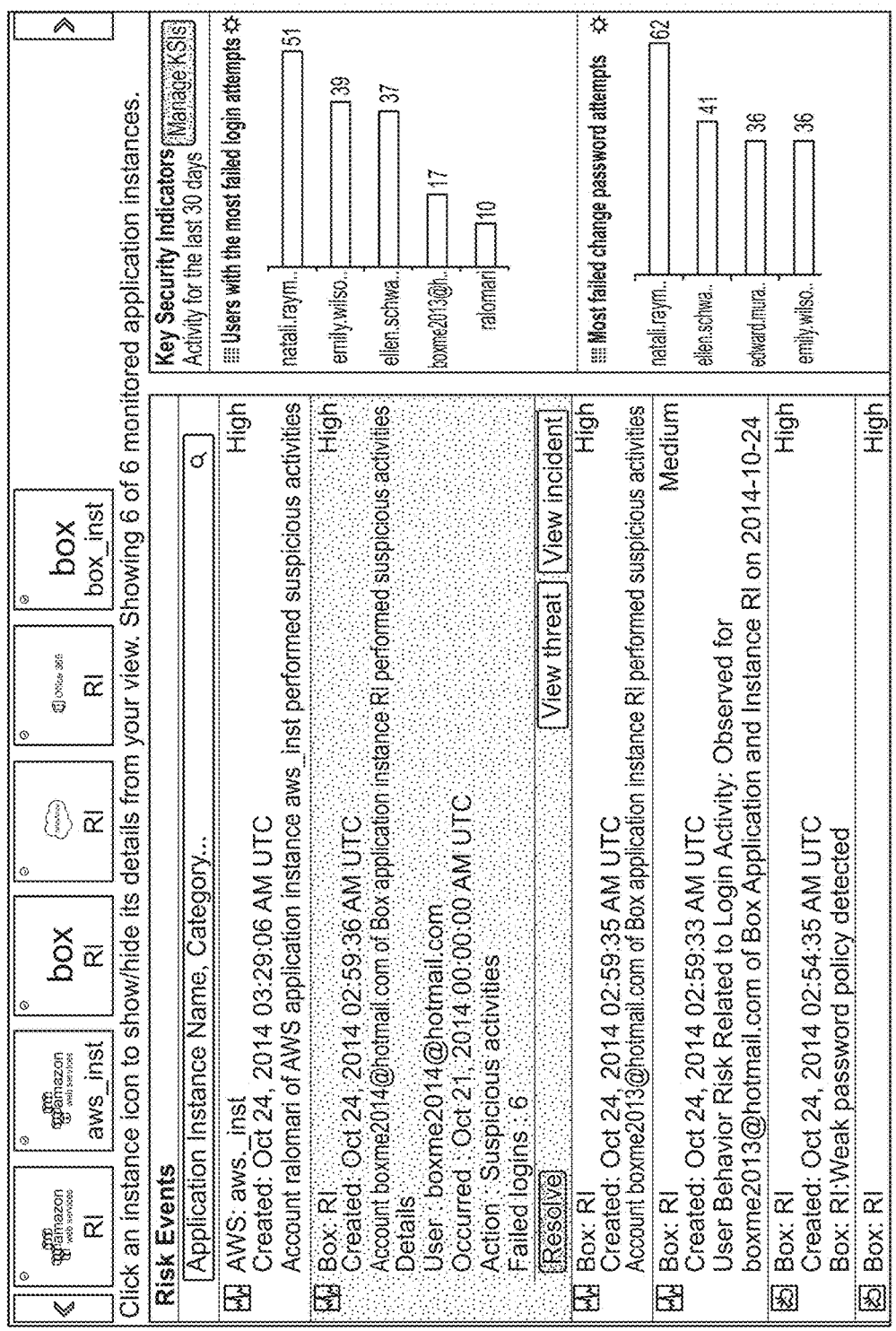
FIG. 8D is a user interface showing various summary views of risk events in accordance with embodiments of the invention.

Threats can also be displayed in a summary view. A user interface showing various summary views of risk events in accordance with embodiments of the invention is shown in FIG. 8D. One window lists risk events showing information similar to the view illustrated in FIG. 8B. A second window shows Key Security Indicators as users with a high count of certain risk events, such as failed login attempts, failed change password attempts, etc.

Specific processes for retrieving and analyzing activity data in accordance with an embodiment of the invention are discussed above. Any of a variety of processes for retrieving and analyzing activity may be utilized in accordance with embodiments of the invention. Processes for the remediation of identified threats are discussed below.

Threat Scenarios and Detection

In various embodiments of the invention, specific techniques such as those discussed below may be utilized to detect and/or address different threat scenarios. Detection may be performed by a Threat Detection and Prediction Analytics Application 212 or other application using information from an Analytics & Threat Intelligence Repository 211, other internal data source, or other external data feed.

In an IP (Internet Protocol) hopping scenario, an attacker may use one or more proxy servers to hide a true location or machine identity before mounting an attack. Detection of this type of scenario can involve geographic resolution (identifying or looking up a geographic location associated with an IP address) of each IP connection used to connect to a cloud application and detect anomalous characteristics in the spatial data to predict threats. Metrics used for detection can include, but are not limited to, a count of the number of unique IP addresses used by a user per day and/or a velocity that can refer to the time difference between the use of different IP addresses and the/or duration that each IP address used.

An unusual geolocation scenario may refer to activities being originated in locations that are unexpected or outside of an established pattern. This scenario may include activities such as, but not limited to, successful logins or file upload/download from unusual geolocations.

A brute force attack scenario may refer to an attacker's attempts to try many passwords in order to discover a correct password and compromise a user account. Detection may involve evaluating the velocity of failed login attempts and patterns in event activities to predict a brute force attack. Moreover, brute force attacks may have different speeds, such as a slow attack or fast attack. Metrics for detection may include, but are not limited to, an unusually high number of login failures for existing valid accounts and/or an unusually high number of login attempts with invalid or terminal/suspended usernames.

Insider threats can refer to enterprise security breaches due to a disgruntled internal employee or employee performing unauthorized actions before having permissions/credentials/access revoked. Detection processes may track a user's normal behavior and generate alerts when events or activities associated with the user's account(s) deviate from the norm. Metrics can include, but are not limited to, an usually high use of corporate resources such as a high number of downloads and/or an employee with a low rating downloading or sharing an unusually high number of files/folders, deleting code from a source code control system, or downloading, deleting, or modifying customer information/contracts.

Application misuse is a scenario that may include events associated with a terminated or suspending employee (expired or revoked user account, cryptographic keys such as SSH key) or a malware-infected device performing an unusual number of file downloads/uploads using valid credentials but an unusual geolocation or IP address.

Application context can refer to using contextual data to improve security threat predictions. Sample contextual data can include, but is not limited to: travel location and itinerary from travel applications or email, employee status from healthcare management (HCM) systems, sensitive financial time period from a Salesforce application, and/or sensitive emails from email servers.

While specific threat scenarios and types of information that can be used to discern these scenarios are discussed above, one skilled in the art would recognize that threat detection and prediction in accordance with embodiments of the invention may utilize any of a variety of information and formulas.

Contextual Data and Analytics

In many embodiments of the invention, contextual data can describe information about a user that is useful in determining the likelihood of a threat. Contextual data may encompass expectations of behavior or actual behavior, such as, but not limited to, where a user is or is expected to be, or how a user does or is expected to log in or access a cloud application (e.g., what type of device or connectivity). In several embodiments, external contextual data may be considered external as it is collected from one or more systems or applications that are different from the systems or applications from which internal activity data is collected and on which threats are being identified using the activity data. This type of data may be correlated or compared to internal activity data that is associated with that user's account(s) on one or more cloud applications and collected from the cloud applications. In this way, likelihood of a threat/risk may be influenced by expectations about a user in the real-world, such as, but not limited to, a user's location or activity at a particular time. In further embodiments of the invention, contextual data may refer to information that is collected within predefined contexts, such as, but not limited to, user information external to (from outside of) a particular cloud application for which analytics are generated (as discussed above and further below), information collected within a particular cloud application that may be utilized in analytics pertaining to a different cloud application, and/or other scenarios for which it is useful to set boundaries for collection.

Contextual data may be harvested from various sources and/or collected when an end user or administrator of a cloud application performs activities. Types of contextual data may include contextual event data such as, but not limited to, IP address of the end user performing the activity, date and time of the activity, type of activity that was performed, details of the resource where the user performed such activity, and/or identity of the user (if the user is authenticated). Contextual IP address reputation data can include, but is not limited to, whether the IP address has been reported as suspicious by a customer or by a reputed commercial or open source threat intelligence organization (for example, using STIX, CSV, or other data format), whether the IP address is a proxy server and what type (for example, HTTP, VPN, etc.), and/or whether the IP address belongs to known anonymizer network (such as Tor). Contextual customer baseline data may define a set of IP addresses or range as white- or black-listed, one or more geolocations (e.g., continent, country, state, city, or combination thereof) from which user connections to a cloud application are white- or black-listed, sets of users or groups of users as high- or low-risk users, target resources that may be very sensitive, and/or one or more time ranges (e.g., time of day and/or day of week) as high- or low-risk.

Contextual data may be analyzed to prepare data feeds for one or more threat prediction algorithms. Types of contextual data analytics may encompass various categories of data including, but not limited to, event correlation analytics, IP address-related information, external threat feed, customer baselines, and/or cloud DLP (data loss prevention). Event correlation analytics can include information such as a list or count of unique IP addresses per day per user (for example, a normal condition being five or less) and/or IP addresses resolved to geolocations within a certain distance from each other (for example, a normal condition being one within 1,000 miles). Additional information can include travel information retrieved from cloud applications (such as Concur) that provides location information about a user such as country, hotel, office locations, and/or addresses from invoices, as well as other sources such as email auto-responses in Gmail/Office 365/etc. or credit card transactions from American Express/etc. Travel information can also be gleaned from customer contact information and locations in applications such as Salesforce to determine whether a user is travel near locations where a customer is based. User employment status and employee performance ratings can be retrieved from human resource applications such as Workday (for example, if an employee is terminated, has pending termination/suspension, low performance rating, etc.) as well as leave information (such as vacations). One skilled in the art will recognize that other sources and other types of information may be utilized as contextual data to improve threat detection and/or prediction in accordance with embodiments of the invention. Information retrieved from applications or sources other than applications in which threats are being monitored can be referred to as external contextual data. In some embodiments, contextual data may be retrieved from monitored applications when the contextual data is not related to activities being performed by the user account within the cloud application and/or describes a user's activities outside of the cloud application (e.g., in the "real world").

IP address-related information can include geolocations to which IP addresses are resolved, connection type, proxy status, etc. External threat feeds can include open source feeds such as Zeus and Tor and commercial feeds such as Norse. Customer baselines may include profiles such as IP ranges, geolocations, etc. using custom policies as discussed above or using standards such as TAXII, STIX, etc. Cloud DLP information can include scanning content storage applications (such as Box, Amazon Web Services, etc.) for possible malware or prohibited content (such as .exe, .dll, .so, .cmd, .bat, .sh, etc. files) or file uploads, downloads, sharing, etc.

Sample Scenario Applying Contextual Data Analytics

Figure 5A:
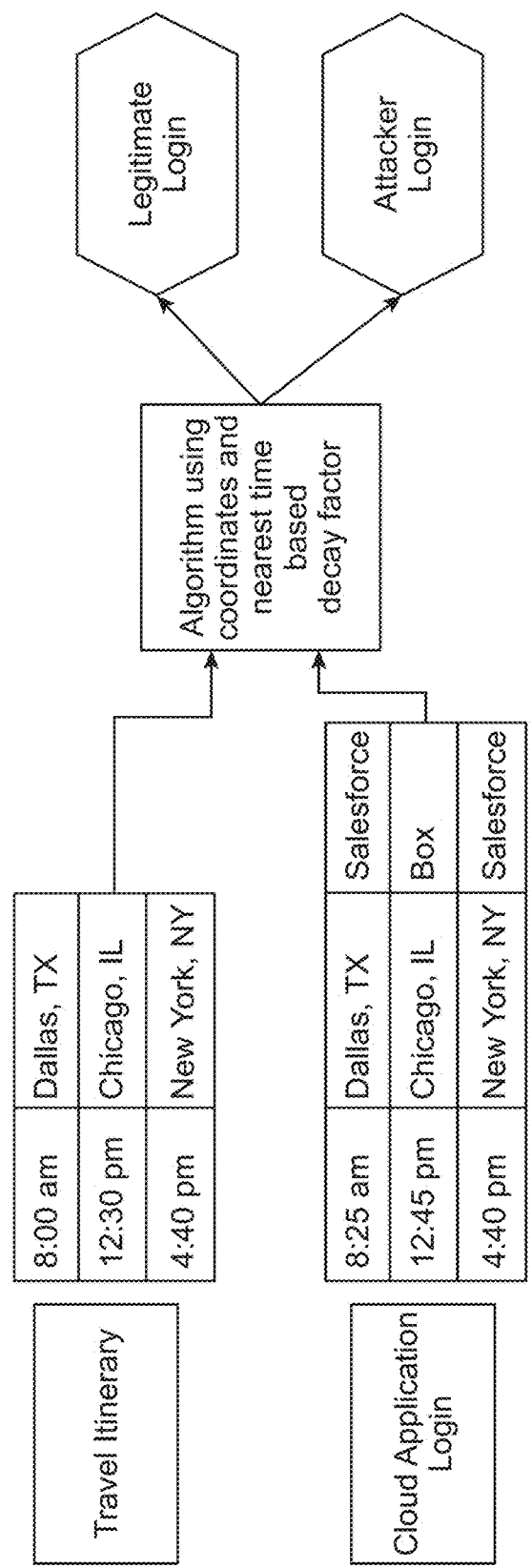
FIG. 5A conceptually illustrates a sample threat detection scenario utilizing contextual data in accordance with embodiments of the invention.

A common scenario can include an employee of a large corporation performing work duties during travel. A traveling user who accesses applications using a laptop, mobile phone, or other device may generate a false alarm in security systems as the user tends to register login events from multiple different geolocations during a short time window. Security detection systems are typically not equipped with contextual information about the user's travel information in order to correlate this information with login events during travel to infer and flag the user as a legitimate user. In many embodiments of the invention, processes for threat detection can correlate cloud application activity logs with contextual information about the user's travel information (such as ticket itinerary, hotel locations, invoice address) to verify whether an enterprise user of cloud application is traveling. The synthesis of contextual data (travel itinerary here) with activity data (cloud application login here) is illustrated in FIG. 5A.

Cloud Security Threat Prediction

Prediction may be performed using a Threat Detection and Prediction Analytics Application 212 or other application using information from an Analytics & Threat Intelligence Repository 211, other internal data source, or other external data feed. Cloud applications typically store activity logs associated with a tenant's account as users associated with the tenant perform various business related activities. User activities may include events such as, but not limited to, logging in to the cloud application, performing contacts management, uploading or downloading business documents, etc. Such event activities can be logged with event details such as, but not limited to, a user name, resource on which the user performed some action, event time, network IP address, etc. In several embodiments, activity data may be retrieved by a cloud data loader application as discussed further above. Information concerning activities may be ingested as raw data. In many embodiments of the invention, raw data is ingested by a batch profiling process.

With batch profiling, activity data is collected and statistics on various user behavioral activities are calculated. In several embodiments, a batch profiling process is run at regular intervals to update statistics. In some embodiments, the batch profiling process is run every 24 hours. In other embodiments, the batch profiling process is run once a day but at a time that is variable. In still other embodiments, batch profiling processes may be run at least once per day or skipping days or with any of a number of other variations as appropriate to the particular application.

Raw data may include information about activities such as, but not limited to, successful login count, failed login count, count of unique IP addresses used to connect to the cloud application. Various statistics may be calculated on the raw data such as average or standard deviation.

In many embodiments, calculated statistics are stored in non-volatile storage.

Profiles can be designed to cover different time periods. In some embodiments, profiles utilize a fixed moving window covering a time period measured in weeks. Several embodiments include one or more "emerging profile" that captures events that are relatively recent, such as within the last week or within a week prior to a target date. Additional embodiments include "stable profiles" that include events within the last four (or eight) weeks or within four (or eight) weeks prior to a target date.

In some embodiments, one or more fixed moving windows are non-overlapping. That is, a window that goes further back in time does not include events in a window that is more recent in time. For example, an eight week profile does not include events in a four week profile or one week profile and similarly the four week profile does not include events within the one week profile. Table 3 below shows example calculated statistics for some user activities in accordance with embodiments of the invention, such as average login count for a four week window profile, average login IP address count for a four week window profile, standard deviation of login count for a one week window profile, standard deviation of login IP address count for a one week window profile, etc.

TABLE 3

| User ID | avglogcntday_4wk | avglogipcntday_4wk | stdlogcntday_1wk | stdlogipcntday_1wk | ... | ... |
|---|---|---|---|---|---|---|
| User 1 | 5 | 4 | 3 | 2 | | |
| User 2 | 6 | 2 | 2 | 1 | | |
| User 3 | 4 | 3 | 2 | 2 | | |
| User 4 | 4 | 4 | 2 | 1 | | |
| User 5 | 5 | 5 | 1 | 1 | | |

Daily (or periodic) aggregation processes may be run intraday. Feature vectors may include, but are not limited to, count of number of logins, count of number of distinct IP addresses used for login, maximum distance between any two IP addresses used by a user within a 24 hour time period, count of number of distinct browsers used in connections to the cloud application within a 24 hour time period, and other similar measures. Feature vectors may be aggregated by application and/or by user per cloud application. Table 4 below shows example daily aggregation matrix vectors in accordance with embodiments of the invention. Table 5 below lists sample values for some daily aggregation matrix vectors in accordance with embodiments of the invention.

information in accordance with embodiments of the invention.

Algorithm 1 can be used to determine login IP address variations. Z-scores are calculated for a login IP address feature vector over different time periods:

$$L1Z\text{-Score} = \frac{(\text{Login } IP \text{ past } 24 \text{ } hrs - 1 \text{ } wk \text{ Avg Login } IP)}{(1 \text{ } Wk \text{ Stddev Login } IP)}$$

TABLE 4

| Application | Dimension | Description |
|---|---|---|
| Amazon, Salesforce, Box | Login | (# of count, Avg, Stddev, Max) |
| Amazon, Salesforce, Box | Failed Login | (# of count, Avg, Stddev, Max) |
| Amazon, Salesforce, Box | Login IP | (# of count, Avg, Stddev, Max) |
| Amazon, Salesforce, Box | Failed Login IP | (# of count, Avg, Stddev, Max) |
| Box | Download | (# of count, Avg, Stddev, Max) |
| Box | Download IP | (# of count, Avg, Stddev, Max) |
| Salesforce | Browsers | (# of count, Avg, Stddev, Max) |
| Salesforce | Mass Delete, Mass Transfer, Data Export | (# of count, Avg, Stddev, Max) |
| Salesforce | Certificate and Key Management | (# of count, Avg, Stddev, Max) |
| Salesforce | Network Access and IP Whitelist Changes | (# of count, Avg, Stddev, Max) |
| Salesforce | Manage User Changes | (# of count, Avg, Stddev, Max) |
| Salesforce | Platforms | (# of count, Avg, Stddev, Max) |
| Salesforce | Password Policy Changes | (# of count, Avg, Stddev, Max) |
| Salesforce | Shared Setting Changes | (# of count, Avg, Stddev, Max) |
| Amazon | EC2 Instance Changes | (# of count, Avg, Stddev, Max) |
| Amazon | Security Group Changes | (# of count, Avg, Stddev, Max) |
| Amazon | SSH Key Pair Changes | (# of count, Avg, Stddev, Max) |
| Amazon | Network ACL Changes | (# of count, Avg, Stddev, Max) |
| Amazon | VPN Connection Changes | (# of count, Avg, Stddev, Max) |
| Amazon | SAML Changes | (# of count, Avg, Stddev, Max) |
| Amazon | VPC Changes | (# of count, Avg, Stddev, Max) |
| Amazon | IAM Access Key Changes | (# of count, Avg, Stddev, Max) |
| ... | ... | ... |

TABLE 5

| User ID | logcntday_1dy | logfailcntday_1dy | logfailipdisday_1dy | logipdisday_1dy | ... | ... | ... |
|---|---|---|---|---|---|---|---|
| User1 | 5 | 4 | 3 | 2 | | | |
| User2 | 6 | 2 | 2 | 1 | | | |
| User3 | 4 | 3 | 2 | 2 | | | |
| User4 | 4 | 4 | 2 | 1 | | | |
| User5 | 5 | 5 | 1 | 1 | | | |

Behavior Analytics Algorithms

Activity data, generated statistics, feature vectors, and other information such as those discussed above may be used in behavior analytics to determine the likelihood of various threats. While specific algorithms are discussed below, one skilled in the art will recognize that the algorithms may be modified and/or use similar different pieces of -continued $$L2Z\text{-Score} = \frac{(\text{Login } IP \text{ past } 24 \text{ } hrs - 4 \text{ } wk \text{ Avg Login } IP)}{(4 \text{ } Wk \text{ Stddev Login } IP)}$$

$$L3Z\text{-Score} = \frac{(\text{Login } IP \text{ past } 24 \text{ } hrs - 8 \text{ } wk \text{ Avg Login } IP)}{(8 \text{ } Wk \text{ Stddev Login } IP)}$$

The Z-scores may be combined with weights (w1 ... w3) assigned to each:

$$L\_Combined=w1*\{L1\ Z\text{-}Score\}+w2*\{L2\ Z\text{-}Score\}+w3*\{L3\ Z\text{-}Score\}$$

In many embodiments, the weights total to 1. Weights that are applied may be calculated dynamically depending on when the calculation is performed. For example, at day 1 default baselines may be applied using values calculated based on existing data: default Avg (average) and default Stddev (standard deviation). For the first week, starting from day 2, an L1 Z-Score is available, so: w1=1, w2=0, w3=0. After 5 weeks, L1 and L2 Z-Scores are available so weights may be applied: w1=0.4, w2=0.6, w3=0. After 14 weeks, L1, L2, and L3 Z-Scores are available, so weights may be applied: w1=0.2, w2=0.3, w3=0.5. An anomaly condition in the variation in login IP addresses may be defined as L_Combined>T where T is set as a threshold.

Algorithm 2 can be used to detect failed login IP address variations. Z-Scores may be calculated for a login IP address feature vector over different time periods:

$$L1Z\text{-Score} = \frac{(\text{Failed Login } IP \text{ past } 24 \text{ hrs} - 1 \text{ wk } Avg \text{ Failed Login } IP)}{(1 \text{ Wk } Stddev \text{ Failed Login } IP)}$$

$$L2Z\text{-Score} = \frac{(\text{Failed Login } IP \text{ past } 24 \text{ hrs} - 4 \text{ wk } Avg \text{ Failed Login } IP)}{(4 \text{ Wk } Stddev \text{ Failed Login } IP)}$$

$$L3Z\text{-Score} = \frac{(\text{Failed Login } IP \text{ past } 24 \text{ hrs} - 8 \text{ wk } Avg \text{ Failed Login } IP)}{(8 \text{ Wk } Stddev \text{ Failed Login } IP)}$$

The Z-scores may be combined with weights (w1 ... w3) assigned to each:

$$L\_Combined=w1*\{L1\ Z\text{-}Score\}+w2*\{L2\ Z\text{-}Score\}+w3*\{L3\ Z\text{-}Score\}$$

In many embodiments, the weights total to 1. Weights that are applied may be calculated dynamically depending on when the calculation is performed. For example, at day 1 default baselines may be applied using values calculated based on existing data: default Avg (average) and default Stddev (standard deviation). For the first week, starting from day 2, an L1 Z-Score is available, so: w1=1, w2=0, w3=0. After 5 weeks, L1 and L2 Z-Scores are available so weights may be applied: w1=0.4, w2=0.6, w3=0. After 14 weeks, L1, L2, and L3 Z-Scores are available, so weights may be applied: w1=0.2, w2=0.3, w3=0.5. An anomaly condition in the variation in failed login IP addresses may be defined as L_Combined>T where T is set as a threshold.

In many embodiments of the invention, anomalous activity that is detected for a user of one cloud application may be utilized by an analytics application, such as a descriptive analytics application 213 or threat detection and prediction analytics application 212 or other application, to calculate or re-calculate the likelihood of a threat in other cloud applications. In this way, new events in another cloud application may be screened proactively to detect and/or predict threats in the other cloud application. Multiple data points across different cloud applications may be correlated to increase the accuracy of a threat score.

Algorithm 3 provides an example of multiple application behavior analytics in accordance with embodiments of the invention. In algorithm 3, user IP addresses associated with various cloud application activities (such as login) are resolved to geolocation coordinates IP1 (Latitude 1, Longitude 1), IP2 (Latitude 2, Longitude 2), IP3 (Latitude 3, Longitude 3), etc. If a user has different usernames in with different cloud applications, the various usernames associated with that user can be mapped to a unique user specific identity that identifies the user across the applications. The distance between any two IP addresses used for logins (e.g., login attempts, successful logins, and/or failed logins) in any of a number of cloud applications (e.g., Amazon Web Services, Box, Salesforce, etc.) by the user can be calculated using any of a variety of distance measurements and/or formulas. In several embodiments, the distance d is calculated using the Haversine Distance formula as follows:

$$\text{Diff\_Long}=\text{Longitude2}-\text{Longitude1},$$
$$\text{Diff\_Latitude}=\text{Latitude2}-\text{Latitude1}$$

$$a=(\sin(\text{Diff\_Latitude}/2))^2+\cos(\text{Latitude1})*\cos(\text{Latitude2})*(\sin(\text{Diff\_Long}/2))^2$$

$$c=2*a\tan 2(\text{sqrt}(a),\text{sqrt}(1-a)),\ d=R*c \text{ (where } R \text{ is the radius of the Earth)}$$

Z-Scores can be calculated to determine deviation of user behavior over different time periods using maximum distances as calculated above:

$$L1Z\text{-Score} = \frac{\{\text{Max } dist \text{ IP Login past } 24 \text{ hrs} - 1 \text{ Wk } Avg \text{ (Max } dist \text{ IP Login/day)}\}}{(1 \text{ Wk } Stddev \text{ (Max } dist \text{ between } IP \text{ Login } IP/\text{day)})}$$

$$L2Z\text{-Score} = \frac{\{\text{Max } dist \text{ IP Login past } 24 \text{ hrs} - 4 \text{ Wk } Avg \text{ (Max } dist \text{ IP Login/day)}\}}{(4 \text{ Wk } Stddev \text{ (Max } dist \text{ between } IP \text{ Login } IP/\text{day)})}$$

$$L3Z\text{-Score} = \frac{\{\text{Max } dist \text{ IP Login past } 24 \text{ hrs} - 8 \text{ Wk } Avg \text{ (Max } dist \text{ IP Login/day)}\}}{(8 \text{ Wk } Stddev \text{ (Max } dist \text{ between } IP \text{ Login } IP/\text{day)})}$$

The Z-scores may be combined with weights (w1 ... w3) assigned to each:

$$L\_Combined=w1*\{L1\ Z\text{-}Score\}+w2*\{L2\ Z\text{-}Score\}+w3*\{L3\ Z\text{-}Score\}$$

In many embodiments, the weights total to 1. Weights that are applied may be calculated dynamically depending on when the calculation is performed. For example, at day 1 default baselines may be applied using values calculated based on existing data: default Avg (average) and default Stddev (standard deviation). For the first week, starting from day 2, an L1 Z-Score is available, so: w1=1, w2=0, w3=0. After 5 weeks, L1 and L2 Z-Scores are available so weights may be applied: w1=0.4, w2=0.6, w3=0. After 14 weeks, L1, L2, and L3 Z-Scores are available, so weights may be applied: w1=0.2, w2=0.3, w3=0.5. An anomaly condition in the variation in IP address locations may be defined as L_Combined>T where T is set as a threshold.

Algorithm 4 provides an example of determining variations in browser or operating system (OS) used to access a cloud application. Z-Scores may be calculated using a feature vector representing a count of the number of different browsers or operating systems used to access a cloud application by a user account over various time periods:

$$L1Z\text{-Score} = \frac{\{\text{Browser}/OS \text{ counts past 24 hrs} - 1 \text{ Wk Avg (Browser}/OS \text{ counts/day})\}}{(1 \text{ Wk Stddev (Browser}/OS \text{ counts/day}))}$$

$$L2Z\text{-Score} = \frac{\{\text{Browser}/OS \text{ counts past 24hrs} - 4 \text{ Wk Avg (Browser}/OS \text{ counts/day})\}}{(4 \text{ Wk Stddev (Browser}/OS \text{ counts/day}))}$$

$$L3Z\text{-Score} = \frac{\{\text{Browser}/OS \text{ counts past 24 hrs} - 8 \text{ Wk Avg (Browser}/OS \text{ counts/day})\}}{(8 \text{ Wk Stddev (Browser}/OS \text{ counts/day}))}$$

The Z-scores may be combined with weights (w1 ... w3) assigned to each:

L_Combined=w1\*{L1 Z-Score}+w2\*{L2 Z-Score}+ w3\*{L3 Z-Score}

In many embodiments, the weights total to 1. Weights that are applied may be calculated dynamically depending on when the calculation is performed. For example, at day 1 default baselines may be applied using values calculated based on existing data: default Avg (average) and default Stddev (standard deviation). For the first week, starting from day 2, an L1 Z-Score is available, so: w1=1, w2=0, w3=0. After 5 weeks, L1 and L2 Z-Scores are available so weights may be applied: w1=0.4, w2=0.6, w3=0. After 14 weeks, L1, L2, and L3 Z-Scores are available, so weights may be applied: w1=0.2, w2=0.3, w3=0.5. An anomaly condition in the variation in browsers or operating systems used to access the cloud application may be defined as L_Combined>T where T is set as a threshold.

Algorithm 5 provides an example of determining variations in the number of downloads from a cloud application. Z-Scores may be calculated using a feature vector representing a count of the number of downloads for a user account over various time periods:

$$L1Z\text{-Score} = \frac{\{\text{Download Counts past 24 hrs} - 1 \text{ Wk Avg (Downloads/day})\}}{(1 \text{ Wk Stddev (Downloads/day)})}$$

$$L2Z\text{-Score} = \frac{\{\text{Download Counts past 24 hrs} - 4\text{Wk Avg (Downloads/day})\}}{(4 \text{ Wk Stddev (Downloads/day)})}$$

$$L3Z\text{-Score} = \frac{\{\text{Download Counts past 24 hrs} - 8 \text{ Wk Avg (Downloads/day})\}}{(8 \text{ Wk Stddev (Downloads/day)})}$$

The Z-scores may be combined with weights (w1 ... w3) assigned to each:

L_Combined=w1\*{L1 Z-Score}+w2\*{L2 Z-Score}+ w3\*{L3 Z-Score}

In many embodiments, the weights total to 1. Weights that are applied may be calculated dynamically depending on when the calculation is performed. For example, at day 1 default baselines may be applied using values calculated based on existing data: default Avg (average) and default Stddev (standard deviation). For the first week, starting from day 2, an L1 Z-Score is available, so: w1=1, w2=0, w3=0. After 5 weeks, L1 and L2 Z-Scores are available so weights may be applied: w1=0.4, w2=0.6, w3=0. After 14 weeks, L1, L2, and L3 Z-Scores are available, so weights may be applied: w1=0.2, w2=0.3, w3=0.5. An anomaly condition in the variation in number of downloads by a user account may be defined as L_Combined>T where T is set as a threshold.

Threat Detection Using Contextual Data

Figure 5B:
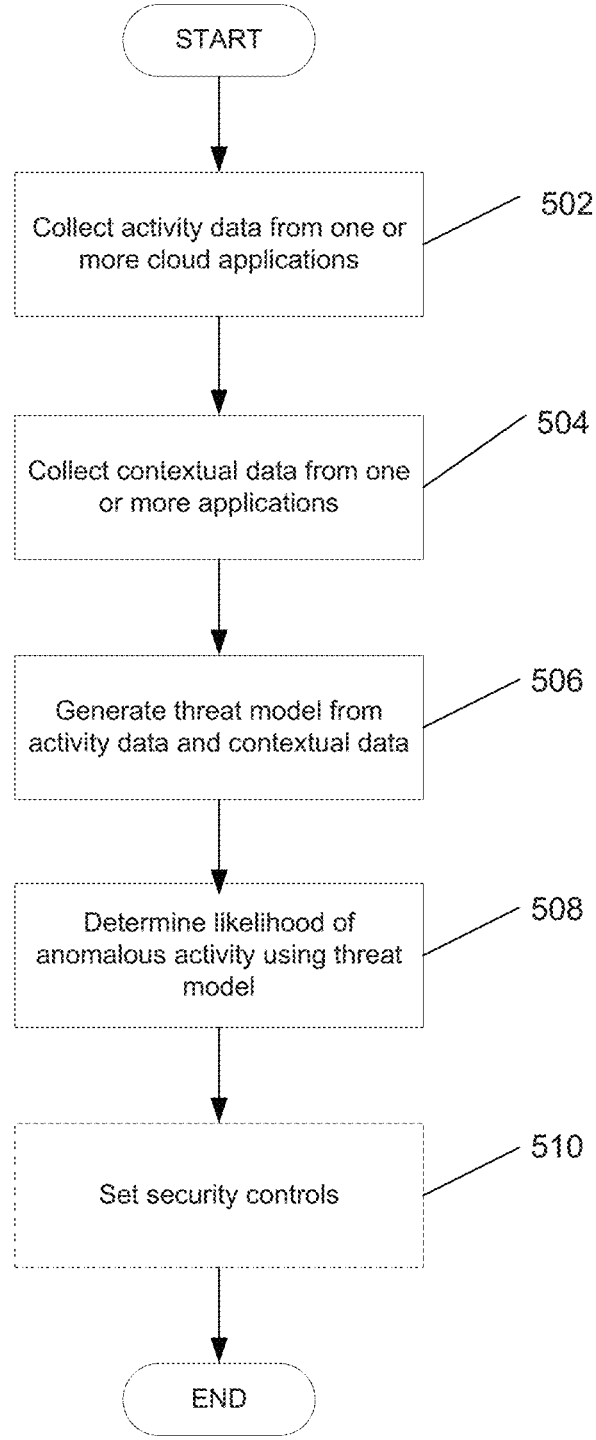
FIG. 5B conceptually illustrates a process for threat detection using contextual data in accordance with embodiments of the invention.

A process for threat detection using contextual data in accordance with embodiments of the invention is illustrated in FIG. 5B. The process includes receiving (502) activity data from one or more cloud applications. In several embodiments, activity data may be retrieved using a cloud data loader process and/or cloud data loader application executing on a system as illustrated in FIG. 4 and discussed further above. In other embodiments, other techniques may be used to collect activity data. In several embodiments, the cloud application(s) from which activity data is collected may be referred to as "monitored" cloud application(s) since it is the application(s) for which threat/risk level will be assessed.

The process includes receiving (504) contextual data from one or more applications, which may be cloud applications or non-cloud applications. Non-cloud applications may include any of a variety of local or distributed applications as would be recognized by one skilled in the art. As discussed further above with respect to various embodiments, contextual data may include information from a context defined by certain criteria that is useful to predict threats in another context. In several embodiments, the contextual data is from a source external to the cloud application from which activity data is collected (502) as above and can be referred to as external contextual data.

One or more threat models are generated (506) using the activity data and contextual data. Threat models can include baseline user profiles over various periods of time as discussed further above or can be expressed as other structured data models that can be used to calculate likelihood of a threat.

The threat model(s) can be used to determine (508) the likelihood of anomalous activity such as, but not limited to, using behavior analytics algorithms as discussed further above. In addition, a risk score can be generated for users in each cloud application. The risk scores can be used to prioritize remediation actions, such as, but not limited to, resetting passwords, restricting access from foreign countries, and/or suspending accounts, as will be discussed further below. In several embodiments, the remediation actions are account-specific to address accounts that display risk issues. Such prioritization can help organizations to correct the most severe issues first.

Although a specific process for detecting threats in cloud applications using contextual data is discussed above with respect to FIG. 5B, any of a number of processes for threat detection may be utilized in accordance with embodiments of the invention.

Figure 5C:
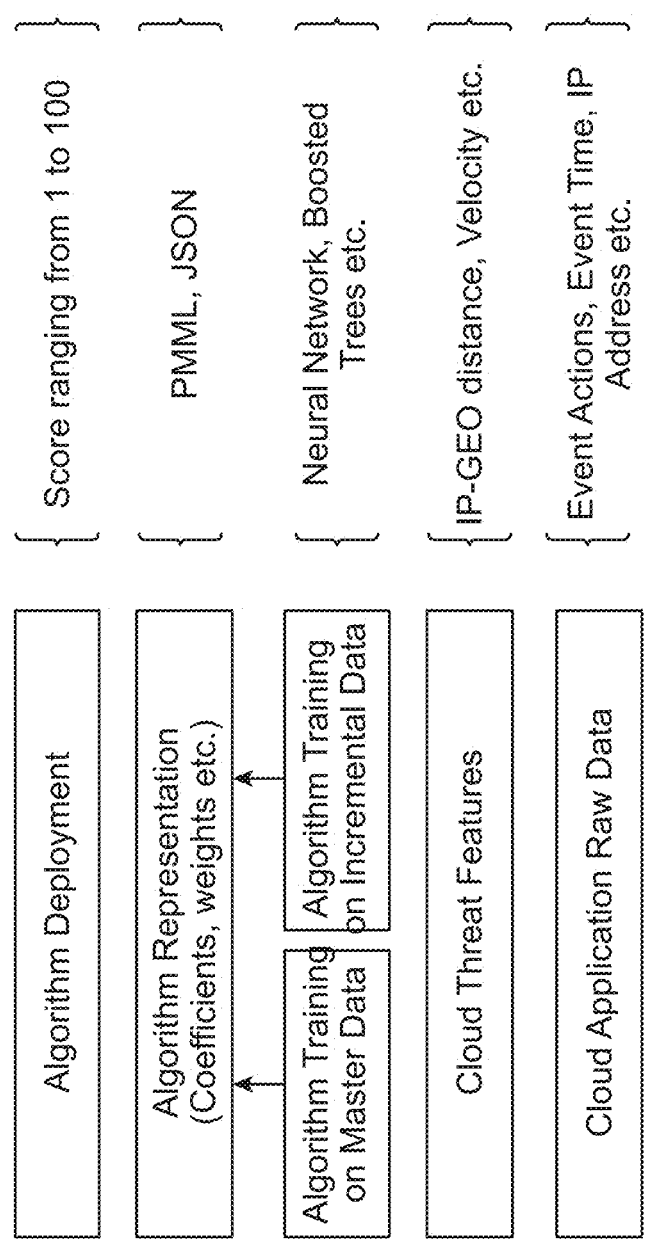
FIG. 5C conceptually illustrates a flow showing the processing of data in different forms to generate threat models in accordance with embodiments of the invention.
Figure 5D:
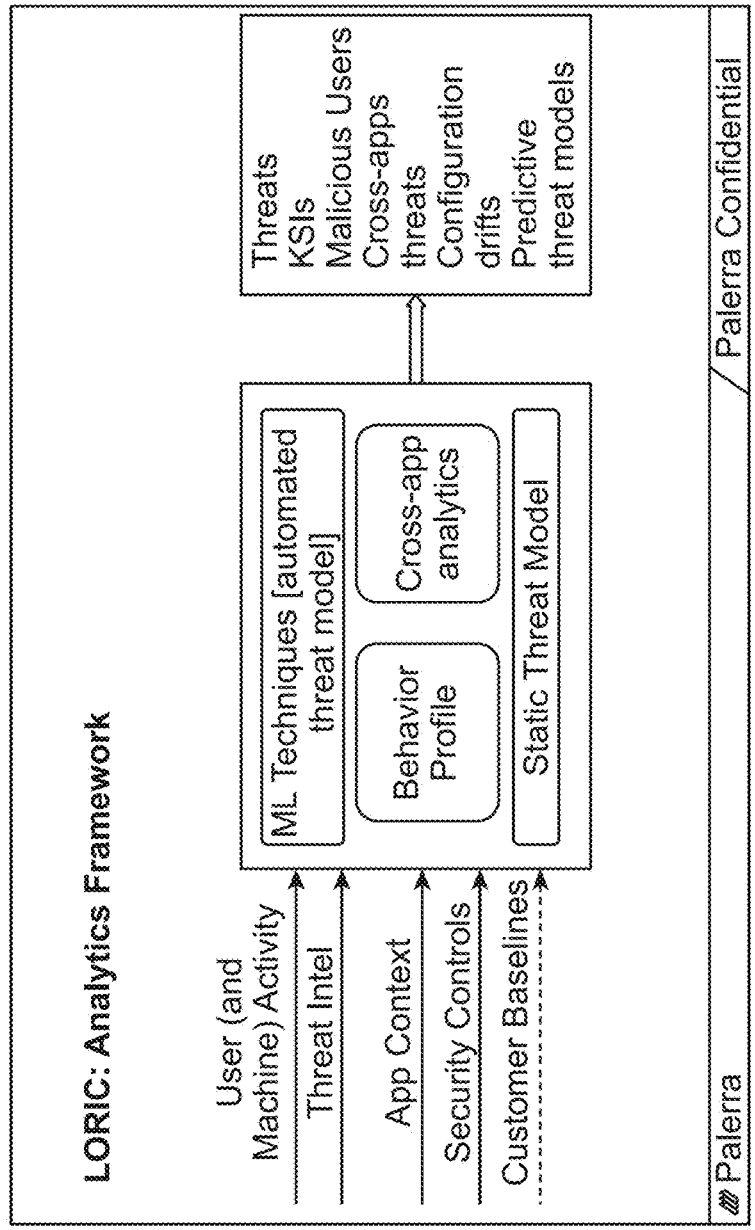
FIG. 5D conceptually illustrates a system overview showing information input and different modules that may be used to process data to generate threat models and other outputs in accordance with embodiments of the invention.

A generalized flow showing the processing of data in different forms to generate threat models in accordance with embodiments of the invention is illustrated in FIG. 5C. A system overview showing information input and different modules that may be used to process data to generate threat models and other output is illustrated in FIG. 5D. Remediation of threats is discussed below.

Remediation

Figure 6:
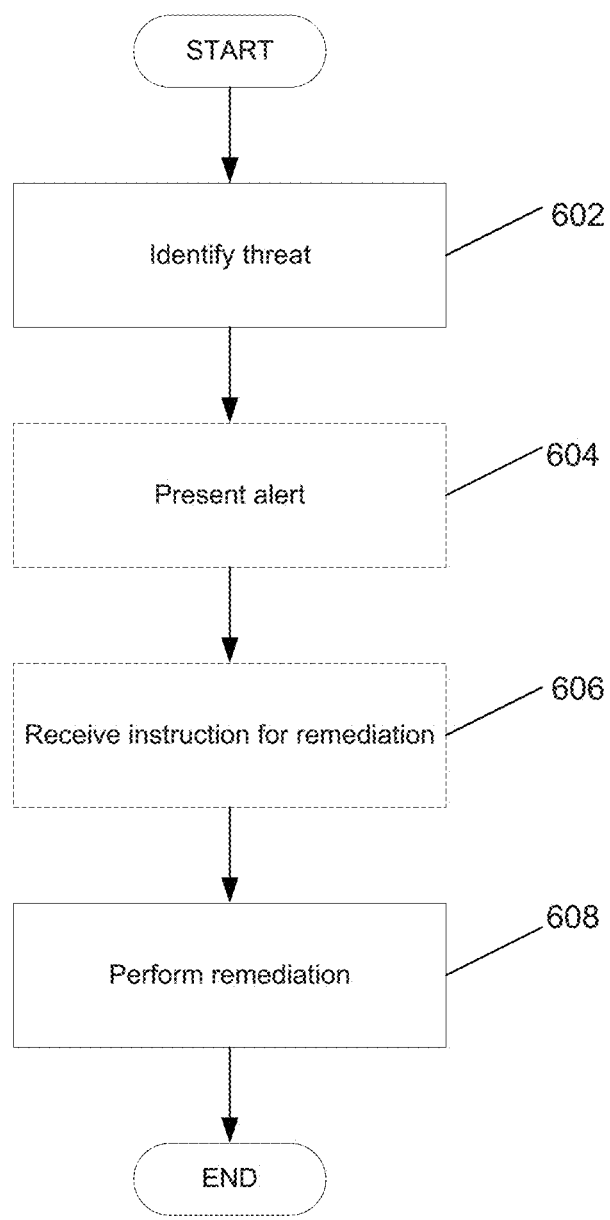
FIG. 6 is a flow chart illustrating a process for remediating a threat in accordance with an embodiment of the invention.

Identified threats can be addressed by a variety of techniques in accordance with embodiments of the invention. Remediation of threats may be automated or manual, soliciting user or administrator involvement. A process for remediating threats in accordance with embodiments of the invention is illustrated in FIG. 6.

The process includes identifying (602) a threat. Threats may be identified using processes such as the analytics and security intelligence processes discussed further above. Threats can include activity, events, or security controls that are abnormal or noncompliant. An alert is presented (604) regarding the identified threat. In many embodiments of the invention, an alert may be visual and may appear in a user console such as a controls management platform discussed further above. In several embodiments, an alert is communicated over a network such as by email, short message service (SMS) or text messaging, or web-based user console. Alerts may be communicated as secure messages (e.g., over a secure communication channel or requiring a key or login credentials to view). An alert may contain information concerning recommended or available remediation action(s), such as implementing stronger security controls, and request a selection of which remediation action(s) to pursue.

In many embodiments, a system for cloud security can interface with third party incident management automation systems such as, but not limited to, ServiceNow and IBM QRadar. External systems may support an API (application programming interface) for interaction. An alert and/or other information concerning an identified threat can be sent to an entity external to the cloud security system such as a tenant's internal IT (information technology) workflow management system or third party incident management automation system for remediation and/or tracking. The external system may return a status (e.g., complete or not complete) to the cloud security system. In this way, remediation may be delegated to an external system with the results reported back to the cloud security system to "close the loop." For example, if a password reset is desired for a user account, the cloud security system can send an alert or message to a tenant's internal IT system managing the user account. An administrator or system may complete the password reset operation and report the status as completed back to the cloud security system. Remediation action(s) to address a threat may be performed automatically, if a response to such threats is predetermined, or may be instructed (606) by a user selecting a remediation option from the alert that was presented.

The selected remediation action(s) are performed (608). Any of a variety of security measures may be taken to address an identified threat such as, but not limited to, deactivating an account, resetting a password, or setting stronger security controls. In many embodiments, the cloud security system performs remedial actions by carrying out recommended measures directly and automatically with use of any agent or proxy.

In some embodiments, remedies may be performed "offline" or outside of visibility of the cloud security monitoring and control system. For example, an alert notifies an administrator, who then makes changes to an external system in which the monitoring and control system does not have visibility. In such cases, an actionable incident can be opened in the monitoring and control system as an open item that can be later set to closed when the changes are completed. Remediation may also include utilizing an incident remediation application 213 to coordinate and/or perform remediation actions and/or a cloud seeder application 204 or process to set security controls as discussed further below.

Specific processes for identification and remediation are discussed above. Any of a variety of processes for identifying and remediating threats can be utilized in accordance with embodiments of the invention. Remediation may include setting the security controls of a tenant's cloud application account. Provisioning a cloud application account with designated security controls is discussed below.

Cloud Seeder

In many embodiments of the invention, a cloud seeder application configures a computing device to provision a cloud application for a tenant with the tenant's desired security posture or security policy. The security posture/policy may include setting security controls to particular values that are associated with a particular level of security. The security posture/policy may be implemented with respect to controls that are specific to one user, or controls that apply to a group of users or all users. The seeder application may be used to coordinate consistent access policies across clouds. In several embodiments, security controls are coordinated across several accounts that a tenant has among different cloud providers. For example, different levels of security may be defined such that when a higher or lower level of security is selected, the security controls for a tenant's accounts with different cloud services are all set to reflect a higher or lower level of security. In this way, a unified policy and security controls configuration can be enforced. The values for various security controls at different levels of security can be defined by input on a user interface such as a controls management platform discussed further above and the values associated with the security controls at each level of security stored in a database. A user interface showing security controls for a tenant's account with a cloud application and the assignment of security control values at a security level in accordance with embodiments of the invention is illustrated in FIG. 8E. In the illustrated embodiment, security controls at a Stringent level of security include password requirements for a user account such as ten minimum characters, two numbers, one special character, one uppercase letter, no reuse of the last ten passwords, etc.

Figure 7:
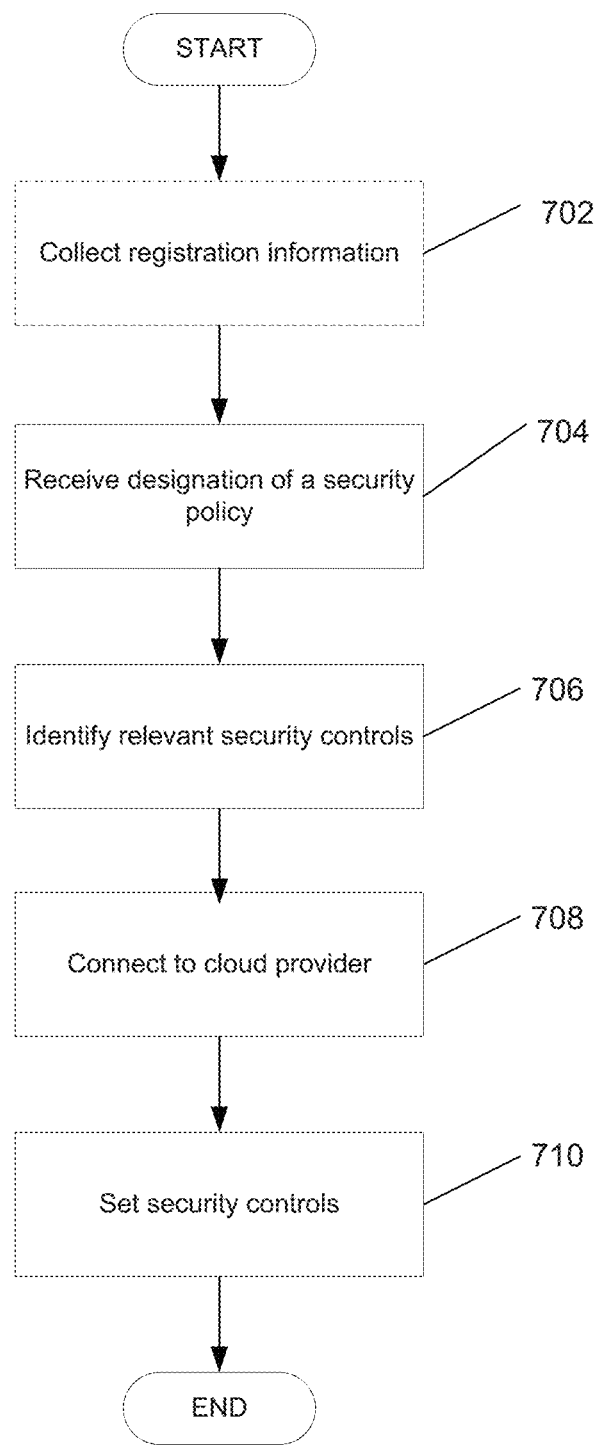
FIG. 7 is a flow chart illustrating a process for provisioning a cloud service to specific security controls in accordance with embodiments of the invention.

A cloud seeder process can be invoked by various applications or by various processes including, but not limited to, a scheduler, incident management system, and/or upon application registration. For example, a cloud seeder process may be initiated by a tenant request, in response to a detected threat, or upon a predetermined schedule. A process for provisioning a cloud application in accordance with embodiments of the invention is illustrated in FIG. 7.

In several embodiments, the process includes collecting (702) registration information from a tenant when registration information has not been previously obtained. Registration information includes authorization to connect to a cloud provider using a tenant's account. Authorization may be provided by a token (such as using the OAuth open standard for authorization) or by credentials (such as a user name and password). In some embodiments, the authorization (via token, credentials, or otherwise) is only provided with respect to the minimum permissions or privileges necessary to configure the relevant security controls. For example, permissions may be granted only to edit user accounts associated with a particular tenant's account and not to access other portions of the cloud service.

In several embodiments, authorization to modify a tenant's account is embodied by a secure token or credentials provided by the tenant. The secure token or credentials are encrypted at rest using encryption keys per any of a variety of encryption standards and stored in a hardware security module (HSM) with access strictly audited. Access to the HSM and encryption keys are regulated by secure software and only trusted code has access to encrypted keys. Transport level access also involves secure communication and any of a variety of encryption techniques. One skilled in the art will recognize that there are various other techniques that can be utilized in authorizing access to a cloud provider's system and data and securing registration information.

The process includes receiving (704) the designation of a security policy. A security policy may be selected or chosen in any of a variety of ways in accordance with embodiments of the invention. Selection may be made by a user from a user interface or automatically by a threat or incident management process in response to a detected threat. A security policy may associate a desired level of security that includes a number of security features with the security controls available in a cloud application to implement that desired level of security. The associations may be stored in a database or other repository and retrieved when the security policy is selected.

The process includes identifying (706) security controls pertinent to the designated security policy. Available security controls may be discovered via processes such as with a cloud crawler application and/or read from an application catalog database as discussed further above. For example, setting a security policy concerning password strength may involve the security controls for password requirements with each cloud application (e.g., number and type of characters).

Using the registration information, the process includes connecting (708) to the cloud provider. The process includes reading the security controls associated with the tenant's account and setting (710) the security controls to the desired configuration. For example, a policy concerning password strength may set security controls governing the number and type of characters required in a password to require at least eight characters using symbols, numbers, and upper and lower case characters.

The processes described above in accordance with embodiments of the invention can be utilized to implement any number of security policies/postures at different levels of security. For example, a security policy at a high level of security may require that user passwords be "strong," e.g., include a variety of characters such as upper and lower case, numbers, and/or symbols. Similarly, security policies at different levels of security may set a session inactivity timer at higher or lower periods of time, e.g., "time out" or automatically log out a user's session. A process to enact a security policy in accordance with embodiments of the invention can identify the relevant security controls in the tenant's accounts with cloud applications to modify and set the controls at the desired values. In several embodiments, software defined security configuration data and/or security controls metadata, discussed further above, can be utilized to identify the relevant security controls.

Specific processes for setting security controls of a cloud application by a security policy are discussed above. Any of a number of processes for setting security controls of a cloud application may be utilized in accordance with embodiments of the invention.

Cloud Beacon

As discussed further above, several techniques can be utilized to remotely retrieve event data from a cloud provider. In further embodiments of the invention, a cloud beacon is embedded in a cloud to monitor activity and capture application activity in real-time. In several embodiments, a cloud beacon can be a Java agent configured and co-located in the running application. In other embodiments, a cloud beacon is a Python program. One skilled in the art will recognize that a cloud beacon can be implemented in any language suitable for the computing environment. The cloud beacon can capture events and activity for one or more tenants utilizing the services of the cloud application. Data captured can include user logins, tokens, session attributes, user roles, groups, data filtering, SQL queries, etc. as well as contextual threat intelligence information such as an IP address reputation, user's geographic location, etc. A cloud beacon can be configured to monitor designated top security vulnerabilities ad security configuration controls as well as capture user activity audit log files for detecting abnormal activities. The collected data can be entered into an analytics and threat intelligence repository database utilizing processes similar to those utilized by a cloud data loader as described further above. In a number of embodiments, a cloud beacon can independently send an alarm based on predetermined events and/or thresholds (as opposed to the alarm being triggered by analysis of data once entered into an analytics repository). Information from a cloud beacon can returned on a scheduled basis and/or in near real-time as collection, events, and/or alerts occur.

Cloud-to-Cloud Threat Warning System

In many embodiments of the invention, a cloud-to-cloud threat warning system provides communications between cloud applications. One cloud application can proactively warn another cloud application of a potential threat. Several business processes require cloud-to cloud-integration. When a threat is identified in a first cloud (e.g., a query from a blocked IP address), a cloud security monitoring and control system in accordance with embodiments of the invention can automatically notify a second cloud that is part of the business process. The notification can include a request or recommendation for a higher level of security controls, such as elevated authentication or OTP validation, in the business process. In several embodiments, the cloud security system can originate and/or coordinate the distribution of notifications and/or alerts to clouds.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method, implemented by a computer system of a network security system, for detecting threat activity related to a cloud application, comprising:
   receiving, from a service provider system, activity data corresponding to one or more actions performed during use of the cloud application by a user account with the cloud application, wherein the service provider system hosts the cloud application, wherein the user account is one of a set of user accounts associated with a tenant account provided by the service provider system for a tenant, wherein the set of user accounts enables one or more users associated with the tenant to access the cloud application;
   receiving, from a system that is different from the service provider system, contextual data associated with a user associated with the user account;
   generating a profile for the user using the activity data and the contextual data, wherein the profile is associated with the user account;
   determining a measure of anomalous activity using the profile;

determining one or more security controls of the service provider system, wherein the one or more security controls are used by the service provider system to configure access to the cloud application;

determining one or more instructions to send to the service provider system, wherein the one or more instructions are based on the measure of anomalous activity; and sending the one or more instructions to the service provider system, wherein the one or more instructions cause at least one security control from the one or more security controls to be changed, and wherein the access to the cloud application when the user account is used to access the cloud application is modified due to the change to the at least one security control.

2. The method of claim 1, wherein the activity data includes a count of unique Internet Protocol (IP) addresses used by the user account per day.

3. The method of claim 1, wherein the activity data includes one or more time differences corresponding to a use of different IP addresses by the user account.

4. The method of claim 1, further comprising:
deriving, using the activity data, a baseline profile associated with the user account, wherein the measure of anomalous activity is determined by comparing the profile to the baseline profile.

5. The method of claim 1, wherein the profile includes a list of IP addresses and valid geolocations associated with the IP addresses.

6. The method of claim 5, further comprising:
based on the measure of anomalous activity, determining a threat related to use of the cloud application when activity occurs from a geolocation that is not on the list of IP addresses and valid geolocations associated with the IP addresses.

7. The method of claim 1, wherein the profile is derived from activity data collected over a time period, wherein the time period is one of a first time period from eight weeks prior to four weeks prior to a target date, a second time period from four weeks prior to one week prior to the target date, or a third time period from one week prior to the target date.

8. The method of claim 7, further comprising:
calculating a risk score for the user, wherein the risk score is based on the profile; and
generating a ranking of a plurality of users of the cloud application based upon the risk score.

9. The method of claim 8, wherein the risk score for the user is used to prioritize threat remediation actions associated with the cloud application, wherein prioritization enables the tenant to remediate most severe issues first.

10. The method of claim 1, wherein the activity data includes a number of login failures associated with the user account.

11. The method of claim 1, wherein the activity data includes a count of login failures greater than a predetermined threshold.

12. The method of claim 1, wherein the activity data includes a count of number of downloads greater than a predetermined threshold.

13. The method of claim 1, wherein the contextual data includes travel plans for the user.

14. The method of claim 1, wherein the contextual data includes credit card transactions by the user.

15. A system for detecting threat activity related to a cloud application, the system comprising:

a processor; and
memory coupled to and readable by the processor, the memory including one or more instructions that, when executed by the processor, cause the processor to:

receive, from a service provider system, activity data corresponding to one or more actions performed during use of the cloud application by a user account with the cloud application, wherein the service provider system hosts the cloud application, wherein the user account is one of a set of user accounts associated with a tenant account provided by the service provider system for a tenant, wherein the set of user accounts enables one or more users associated with the tenant to access the cloud application;

receive, from a system that is different from the service provider system, contextual data associated with a user associated with the user account;

generate a profile for the user using the activity data and the contextual data, wherein the profile is associated with the user account;

determine a measure of anomalous activity using the profile;

determine one or more security controls of the service provider system, wherein the one or more security controls are used by the service provider system to configure access to the cloud application;

determine one or more instructions to send to the service provider system, wherein the one or more instructions are based on the measure of anomalous activity; and send the one or more instructions to the service provider system, wherein the one or more instructions cause at least one security control from the one or more security controls to be changed, and wherein the access to the cloud application when the user account is used to access the cloud application is modified due to the change to the at least one security control.

16. The system of claim 15, wherein the activity data includes a count of unique Internet Protocol (IP) addresses used by the user account per day.

17. The system of claim 15, wherein the activity data includes one or more time differences corresponding to a use of different IP addresses by the user account.

18. The system of claim 15, wherein the one or more instructions further include instructions that, when executed by the processor, cause the processor to:
derive, using the activity data, a baseline profile associated with the user account, wherein the measure of anomalous activity is determined by comparing the profile to the baseline profile.

19. The system of claim 15, wherein the profile includes a list of IP addresses and valid geolocations associated with the IP addresses.

20. The system of claim 19, wherein the one or more instructions further include instructions that, when executed by the processor, cause the processor to:
based on the measure of anomalous activity, determine a threat related to use of the cloud application when activity occurs from a geolocation that is not on the list of IP addresses and valid geolocations associated with the IP addresses.

21. The system of claim 15, wherein the profile is derived from activity data collected over a time period, wherein the time period is one of a first time period from eight weeks prior to four weeks prior to a target date, a second time period from four weeks prior to one week prior to the target date, or a third time period from one week prior to the target date.

22. The system of claim 21, wherein the one or more instructions further include instructions that, when executed by the processor, cause the processor to:
  calculate a risk score for the user, wherein the risk score based on the profile; and
  generate a ranking of a plurality of users of the cloud application based upon the risk score.

23. The system of claim 22, wherein the risk score for the user is used to prioritize threat remediation actions associated with the cloud application, wherein prioritization enables the tenant to remediate most severe issues first.

24. The system of claim 15, wherein the activity data includes a number of login failures associated with the user account.

25. The system of claim 15, wherein the activity data includes a count of login failures greater than a predetermined threshold.

26. The system of claim 15, wherein the activity data includes a count of number of downloads greater than a predetermined threshold.

27. The system of claim 15, wherein the contextual data includes travel plans for the user.

28. The system of claim 15, wherein the contextual data includes credit card transactions by the user.

* * * * *

UNITED STATES PATENT AND TRADEMARK OFFICE
CERTIFICATE OF CORRECTION

Page 1 of 2

PATENT NO. : 10,063,654 B2
APPLICATION NO. : 14/749522
DATED : August 28, 2018
INVENTOR(S) : Kirti et al.

It is certified that error appears in the above-identified patent and that said Letters Patent is hereby corrected as shown below:

On the Title Page

On page 2, Column 2, under Other Publications, Line 12, delete "_leaming," and insert -- _learning, --, therefor.

In the Drawings

On sheet 2 of 17, in FIG. 2, under Reference Numeral 202, Line 2, delete "application" and insert -- Application --, therefor.

On sheet 2 of 17, in FIG. 2, under Reference Numeral 204, Line 2, delete "application" and insert -- Application --, therefor.

On sheet 2 of 17, in FIG. 2, under Reference Numeral 206, Line 2, delete "application" and insert -- Application --, therefor.

On sheet 2 of 17, in FIG. 2, under Reference Numeral 202, Line 1, delete "processor" and insert -- Processor --, therefor.

On sheet 14 of 17, in FIG. 8C, Line 11, delete "Unusal" and insert -- Unusual --, therefor.

On sheet 14 of 17, in FIG. 8C, Line 12, delete "Downlods" and insert -- Downloads --, therefor.

On sheet 15 of 17, in FIG. 8C (Cont.), Line 12, delete "Unusal" and insert -- Unusual --, therefor.

In the Specification

In Column 1, Line 38, delete "Docusign" and insert -- DocuSign --, therefor.

In Column 1, Line 61, delete "internet protocol" and insert -- Internet Protocol --, therefor.

Signed and Sealed this
Second Day of March, 2021

Drew Hirshfeld
*Performing the Functions and Duties of the
Under Secretary of Commerce for Intellectual Property and
Director of the United States Patent and Trademark Office*

In Column 7, Line 2, delete "(universal resource locator)." and insert -- (Universal Resource Locator). --, therefor.

In Column 21, Line 24, delete "L1Z" and insert -- L1 Z --, therefor.

In Column 21, Line 28, delete "L2Z" and insert -- L2 Z --, therefor.

In Column 21, Line 32, delete "L3Z" and insert -- L3 Z --, therefor.

In Column 22, Line 21, delete "$c=2*a \tan 2(sqrt(a), sqrt(1-a))$," and insert -- $c = 2 * atan2(\ sqrt(a),\ sqrt(1-a)\ )$, --, therefor.

In Column 22, Line 28, delete "L1Z" and insert -- L1 Z --, therefor.

In Column 22, Line 34, delete "L2Z" and insert -- L2 Z --, therefor.

In Column 22, Line 41, delete "L3Z" and insert -- L3 Z --, therefor.

In the Claims

In Column 30, Line 2, in Claim 15, before "memory" insert -- a --.